(12) United States Patent
Matsuda et al.

(10) Patent No.: US 10,305,554 B2
(45) Date of Patent: May 28, 2019

(54) TRANSMISSION DEVICE AND RECEPTION DEVICE

(71) Applicant: SONY CORPORATION, Tokyo (JP)

(72) Inventors: Hiroki Matsuda, Tokyo (JP); Ryota Kimura, Tokyo (JP)

(73) Assignee: SONY CORPORATION, Tokyo (JP)

(*) Notice: Subject to any disclaimer, the term of this patent is extended or adjusted under 35 U.S.C. 154(b) by 6 days.

(21) Appl. No.: 15/746,700

(22) PCT Filed: Oct. 17, 2016

(86) PCT No.: PCT/JP2016/080714
§ 371 (c)(1),
(2) Date: Jan. 22, 2018

(87) PCT Pub. No.: WO2017/077848
PCT Pub. Date: May 11, 2017

(65) Prior Publication Data
US 2018/0219590 A1    Aug. 2, 2018

(30) Foreign Application Priority Data

Nov. 2, 2015    (JP) .................................. 2015-215632

(51) Int. Cl.
*H04L 27/00* (2006.01)
*H04B 7/0456* (2017.01)
(Continued)

(52) U.S. Cl.
CPC ......... *H04B 7/0456* (2013.01); *H04B 7/0619* (2013.01); *H04B 7/0639* (2013.01);
(Continued)

(58) Field of Classification Search
CPC . H04B 7/0456; H04B 7/0639; H04J 11/0036; H04L 27/34; H04W 52/18
(Continued)

(56) References Cited

U.S. PATENT DOCUMENTS 9,794,902 B2 * 10/2017 Shen ................. H04W 56/0015
2008/0102764 A1 * 5/2008 Thornton ............... H04B 7/086
455/84

(Continued)

FOREIGN PATENT DOCUMENTS

EP    2 858 281 A1    4/2015
JP    2003-078419    3/2003
(Continued)

OTHER PUBLICATIONS

Saito, et al., "Non-Orthogonal Multiple Access (NOMA) for Future Radio Access", 2013 IEEE 77th Vehicular Technology Conference (VTC Spring), XP055197795, Jun. 1, 2013, Total 5 pages.
(Continued)

*Primary Examiner* — Dhaval V Patel
(74) *Attorney, Agent, or Firm* — Xsensus LLP

(57) ABSTRACT

A device that selects a transmission weight by which each of a plurality of signal points is to be multiplied; multiplies a signal corresponding to each of the plurality of signal points by the selected transmission weight; multiplexes the multiplied signals corresponding to each of the plurality of signal points on a same frequency and time resource; and modifies a selection rule corresponding to the transmission weight by which each of the plurality of signal points is to be multiplied.

20 Claims, 20 Drawing Sheets

(51) Int. Cl.
*H04B 7/06* (2006.01)
*H04L 27/18* (2006.01)
*H04L 27/26* (2006.01)
*H04L 27/34* (2006.01)
*H04J 11/00* (2006.01)
*H04W 52/18* (2009.01)

(52) U.S. Cl.
CPC ........ *H04B 7/0665* (2013.01); *H04J 11/0036* (2013.01); *H04L 27/183* (2013.01); *H04L 27/2626* (2013.01); *H04L 27/34* (2013.01); *H04L 27/3488* (2013.01); *H04J 11/004* (2013.01); *H04L 27/2647* (2013.01); *H04W 52/18* (2013.01)

(58) Field of Classification Search
USPC .............. 375/211, 219, 260, 267, 299, 340; 370/315, 329, 337, 478, 491
See application file for complete search history.

(56) References Cited

U.S. PATENT DOCUMENTS

| | | | | |
|---|---|---|---|---|
| 2010/0058137 A1* | 3/2010 | Yokoyama | ........... | H04B 7/0617 714/748 |
| 2010/0202497 A1* | 8/2010 | Lee | ........ | H04B 7/024 375/211 |
| 2011/0090985 A1* | 4/2011 | Zhou | ...... | H04B 7/043 375/295 |
| 2011/0110448 A1 | 5/2011 | Zhou et al. | | |
| 2012/0087429 A1 | 4/2012 | Zhou et al. | | |
| 2012/0178381 A1* | 7/2012 | Jiang | .................... | H04B 7/0617 455/69 |
| 2012/0314664 A1* | 12/2012 | Johansson | ......... | H04W 74/0833 370/329 |
| 2013/0279720 A1* | 10/2013 | Wu | .......... | H04R 3/12 381/107 |
| 2014/0274088 A1* | 9/2014 | Talwar | ................ | H04J 11/0023 455/452.1 |
| 2015/0071253 A1 | 3/2015 | Zhou et al. | | |
| 2015/0171983 A1 | 6/2015 | Kusashima | | |
| 2016/0050006 A1* | 2/2016 | Ko | ........................ | H04B 17/00 370/329 |

FOREIGN PATENT DOCUMENTS

| | | |
|---|---|---|
| JP | 2003-229835 | 8/2003 |
| JP | 2013-247513 | 12/2013 |

OTHER PUBLICATIONS

Higuchi, "Non-orthogonal Multiple Access (NOMA) with Successive Interference Cancellation for Future Radio Access", IEICE Transactions on Communications, vol. E98-B, No. 3, Mar. 2015, Total 12 Pages.

International Search Report dated Jan. 12, 2017 in PCT/JP2016/080714 filed Oct. 17, 2016.

* cited by examiner

[Fig. 1]
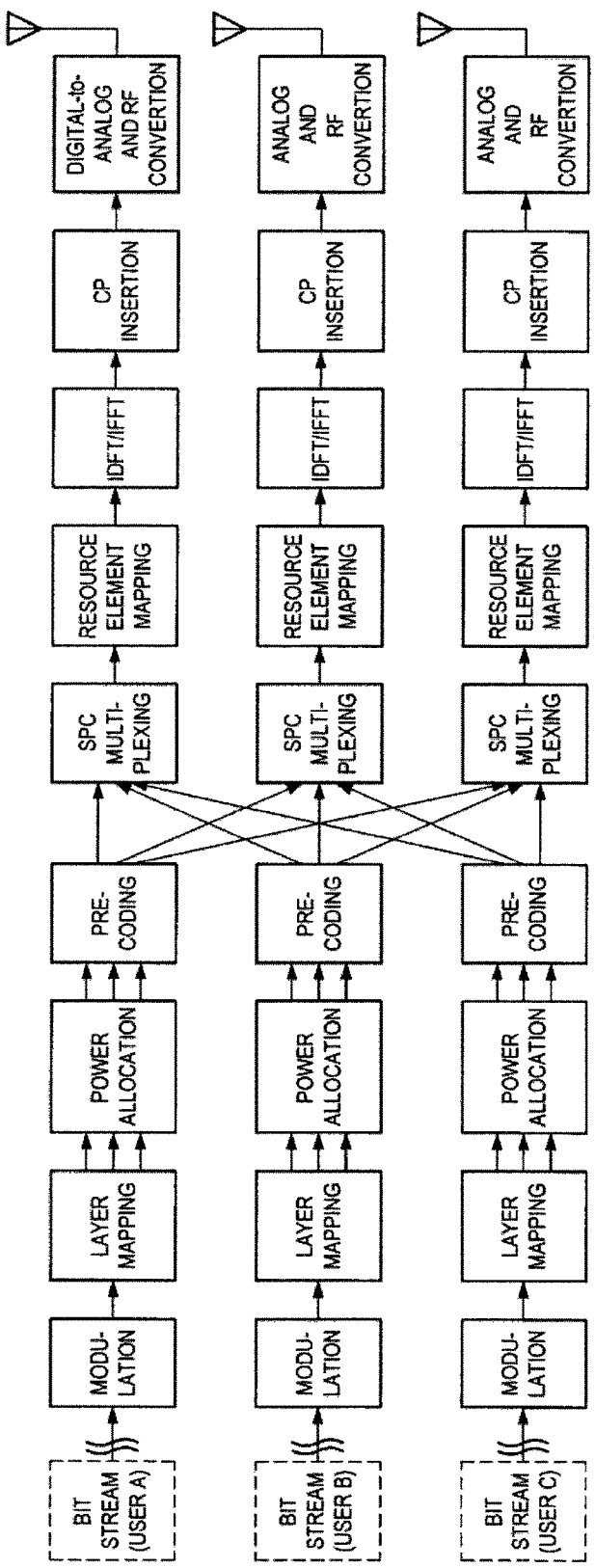

[Fig. 2]
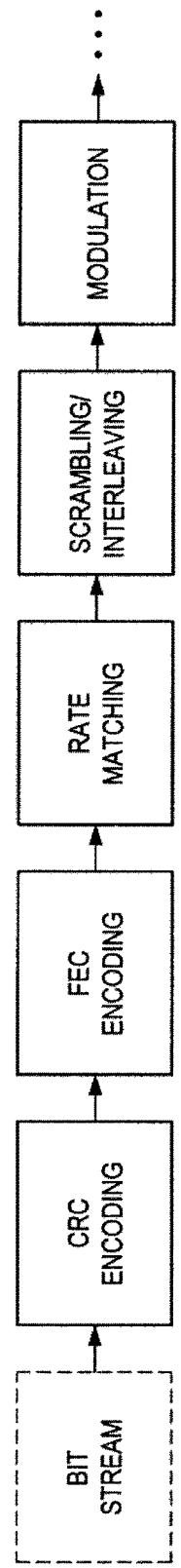

[Fig. 3]
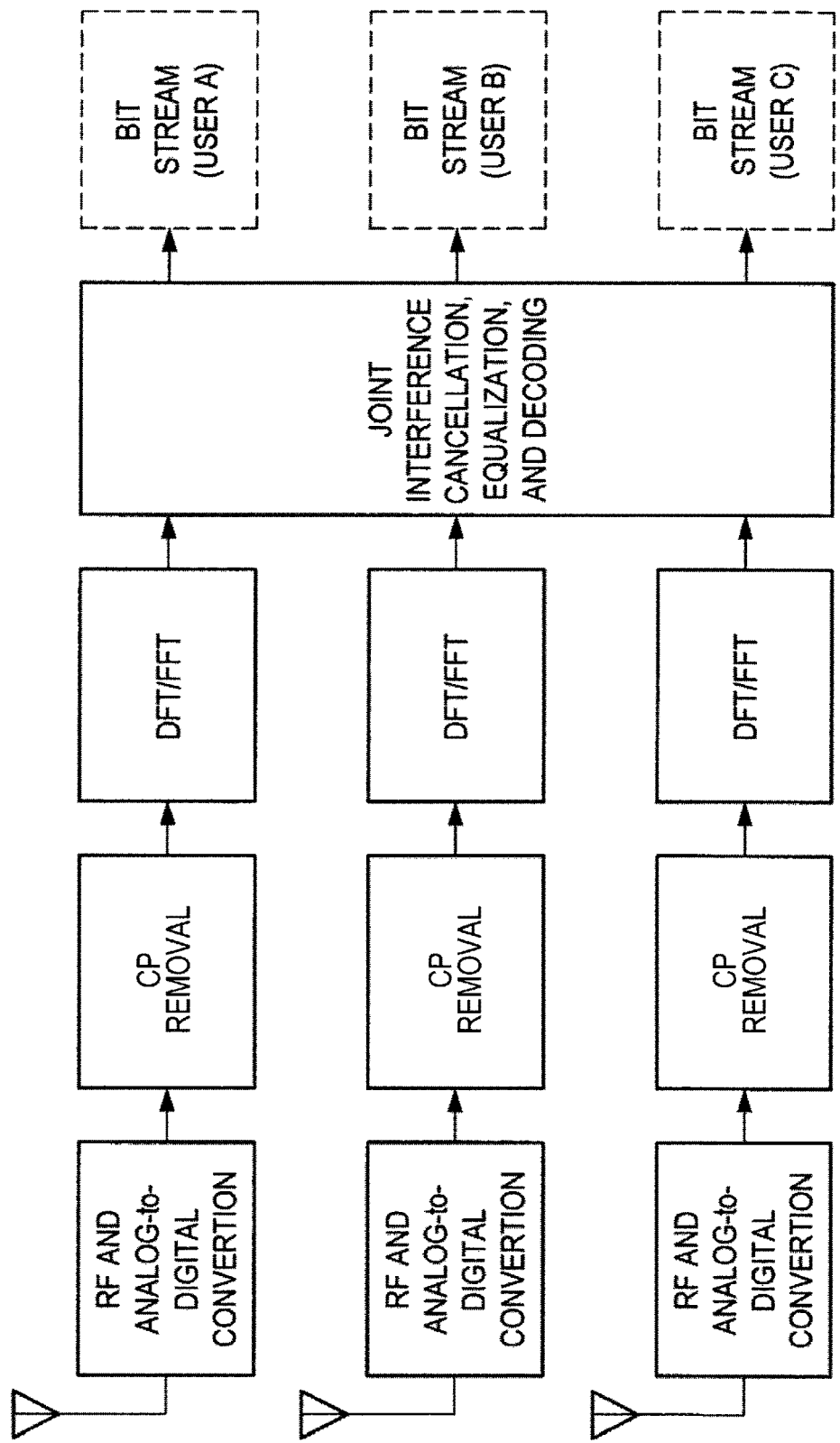

[Fig. 4]
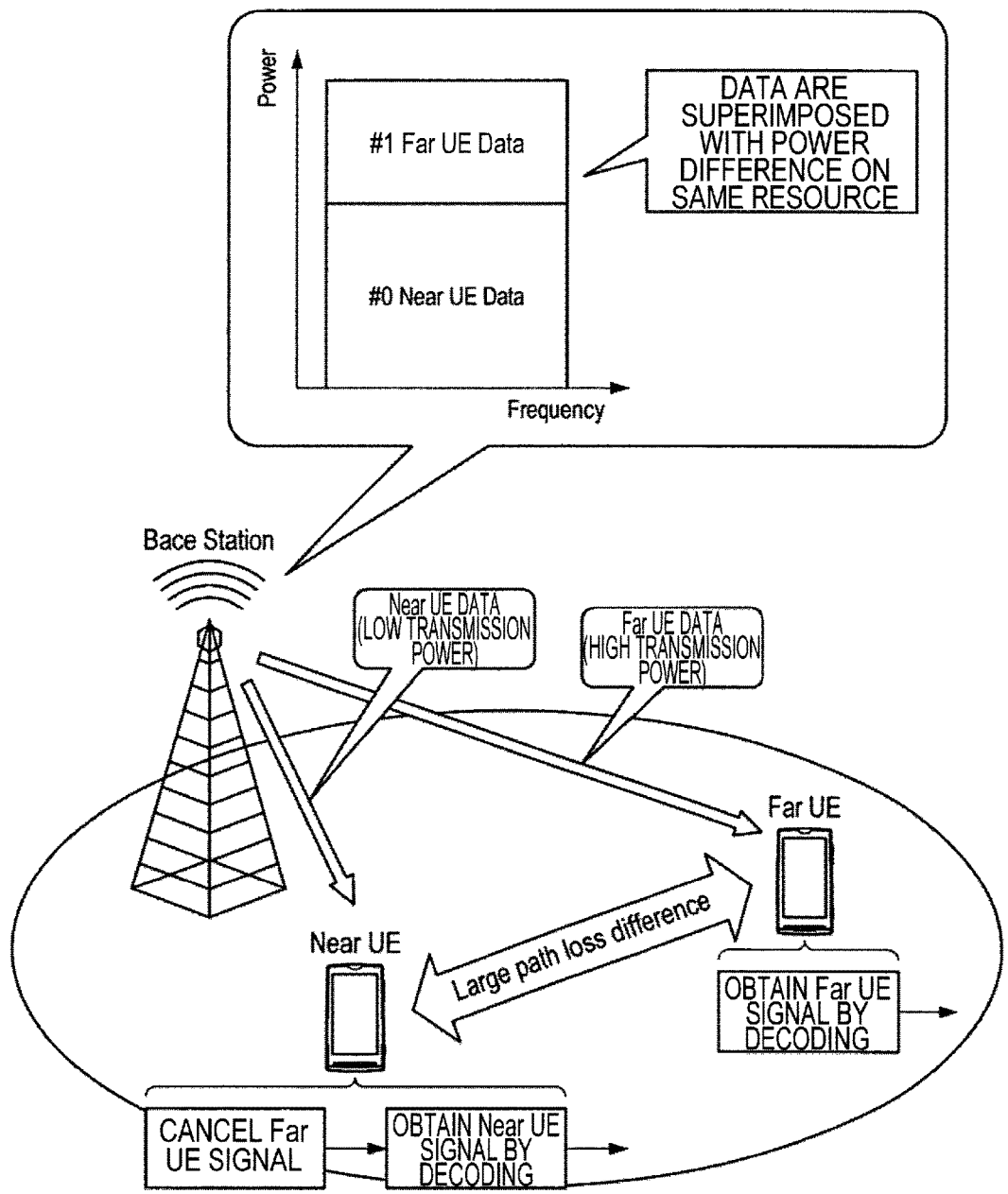

[Fig. 5]
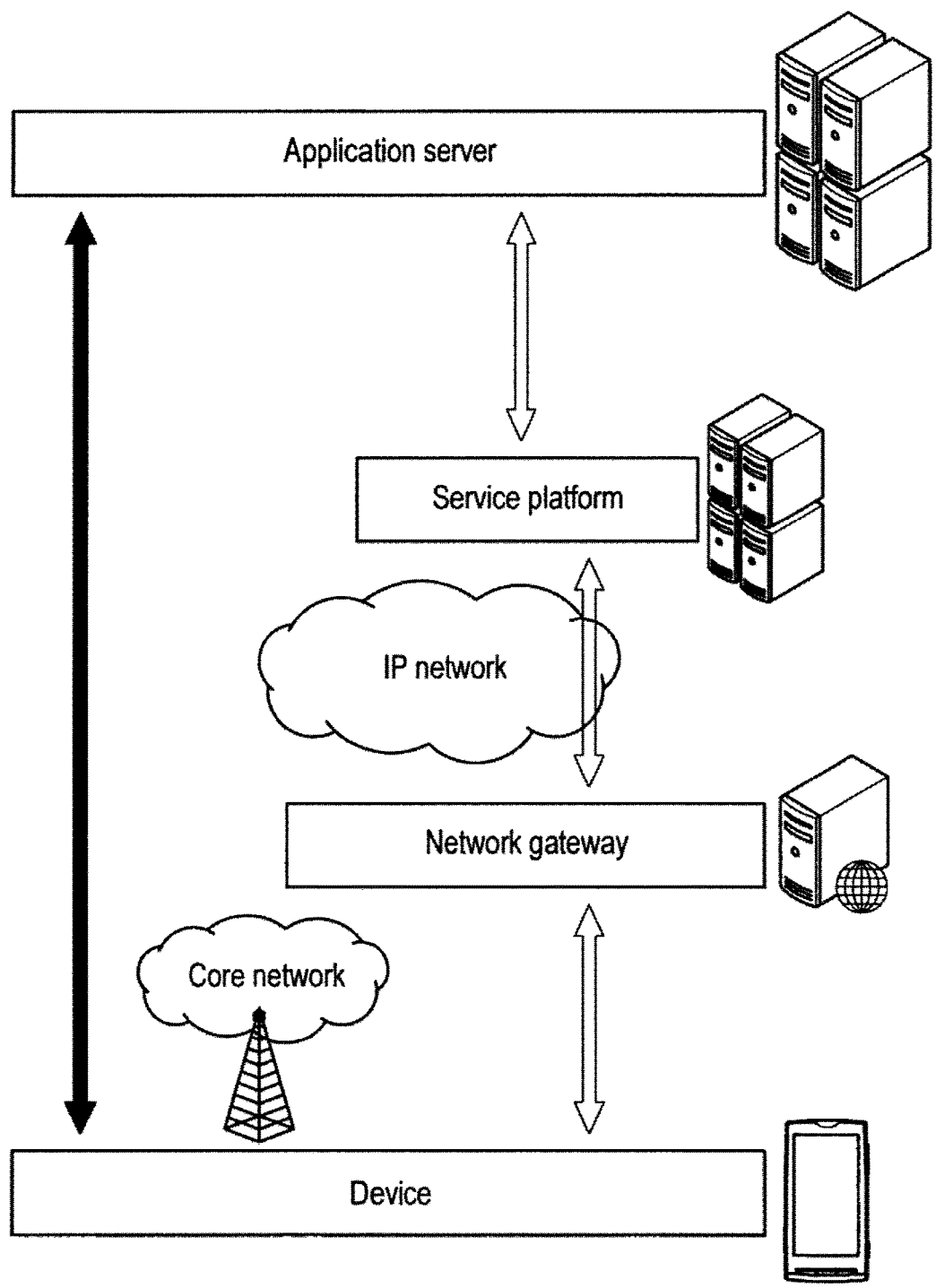

[Fig. 6]
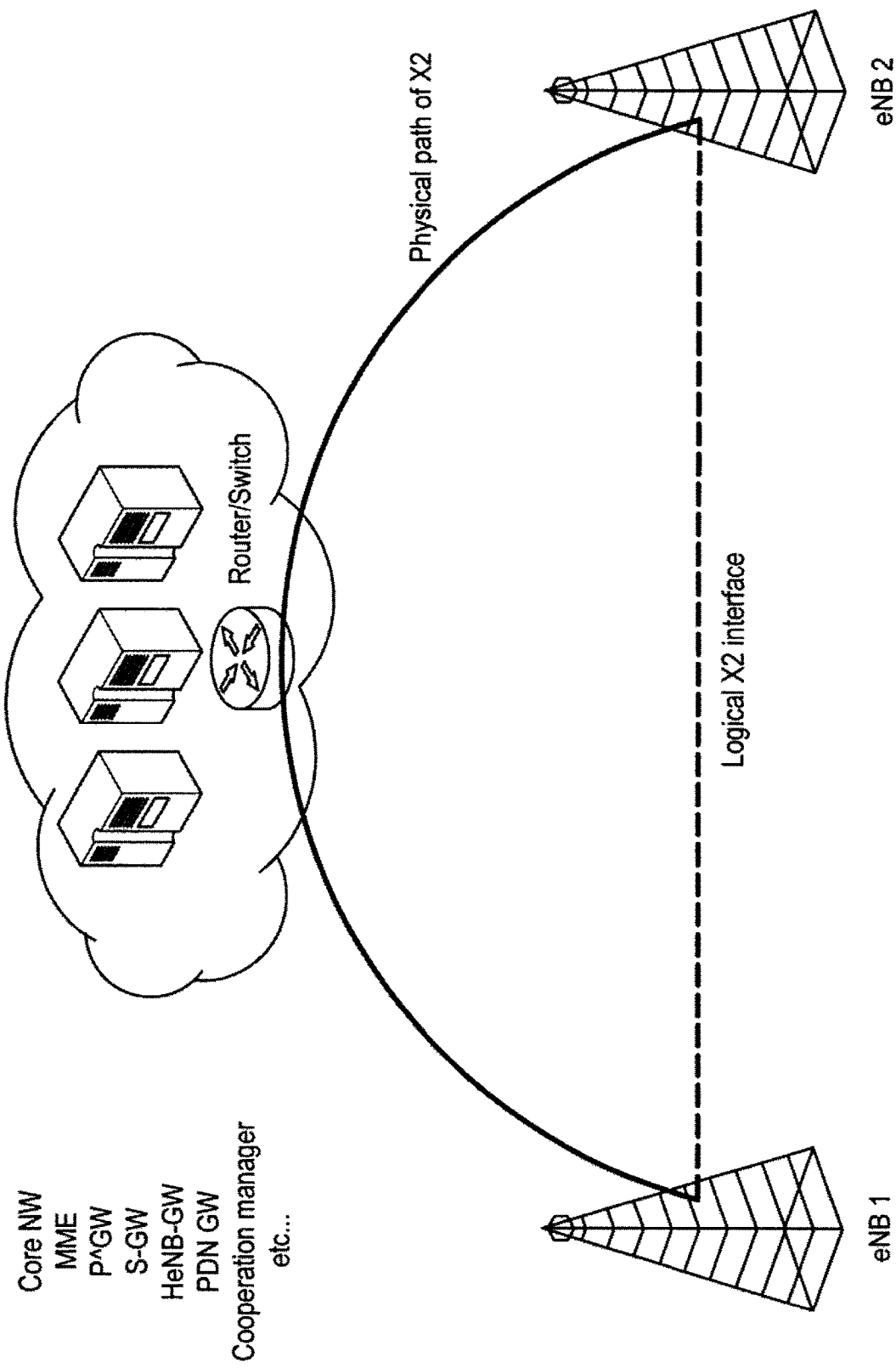

[Fig. 7]
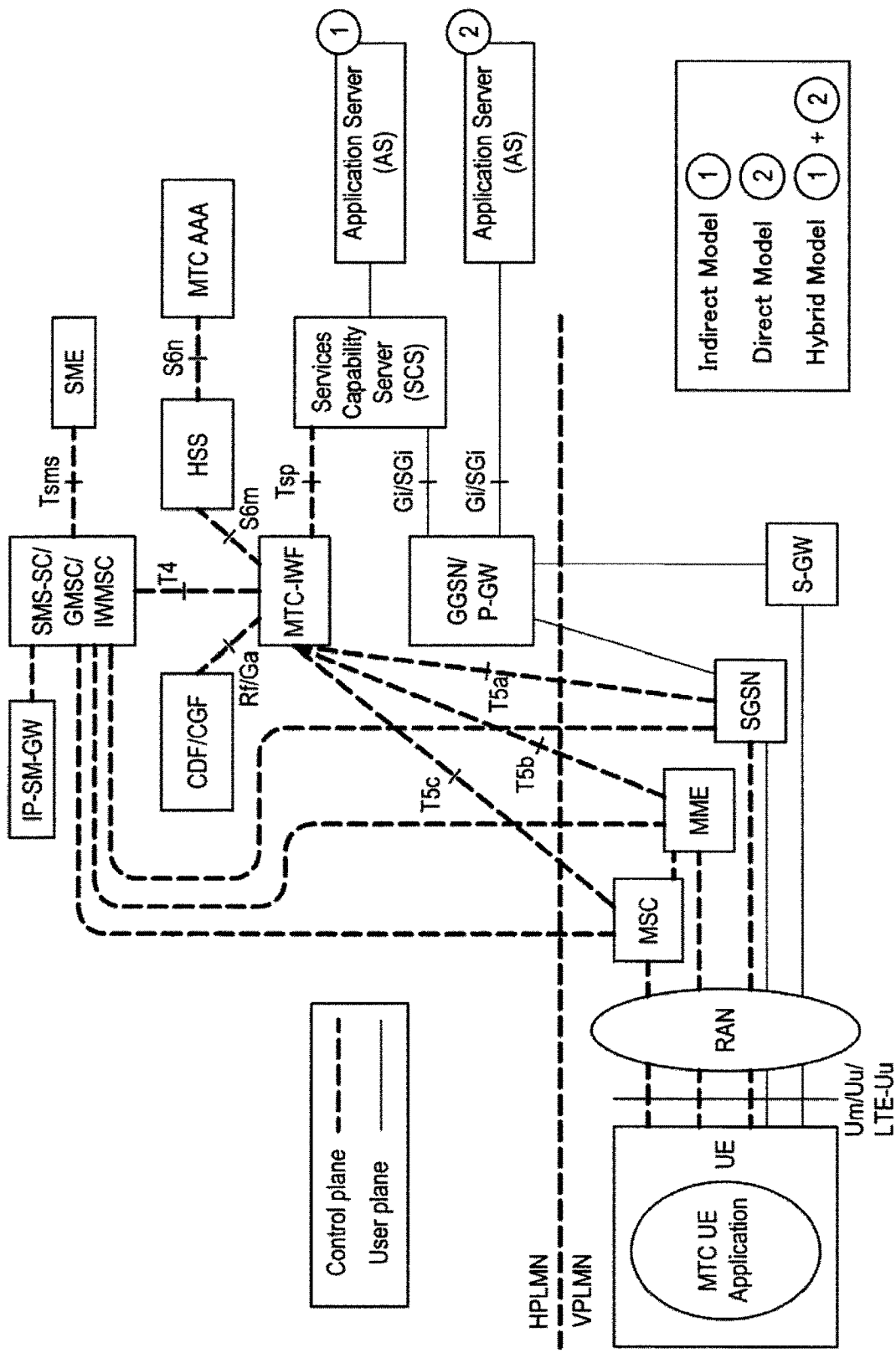

[Fig. 8]
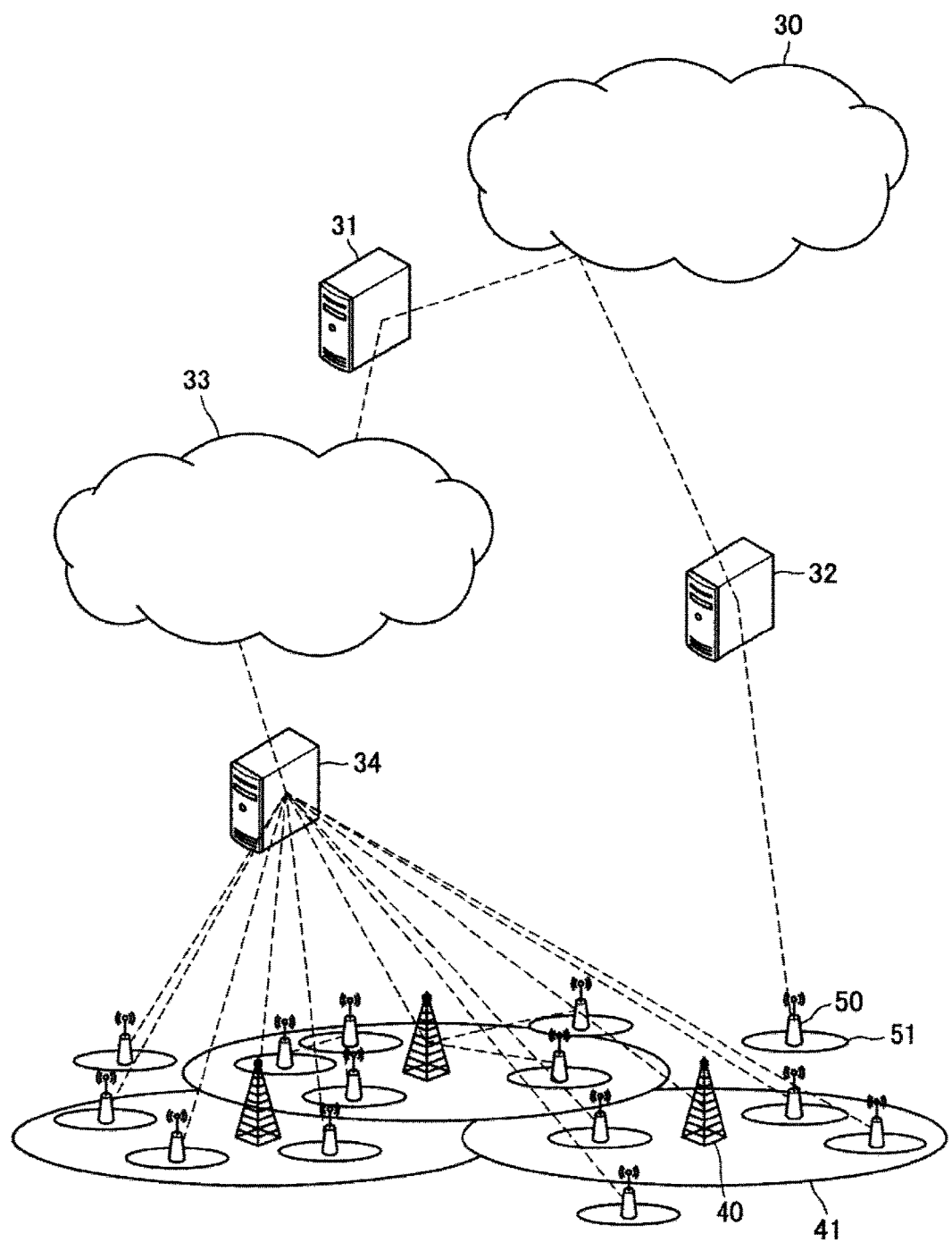

[Fig. 9]
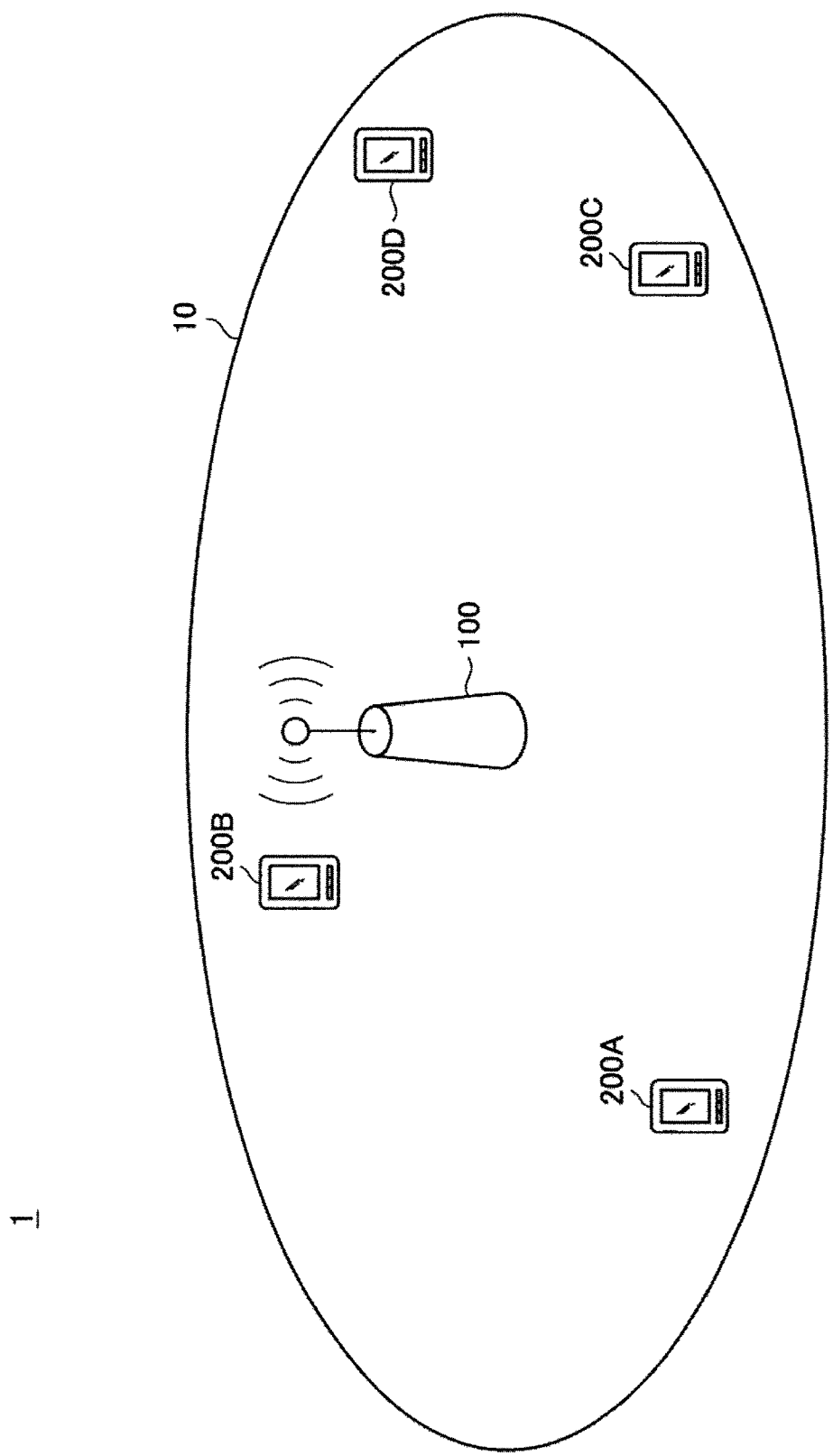

[Fig. 10]
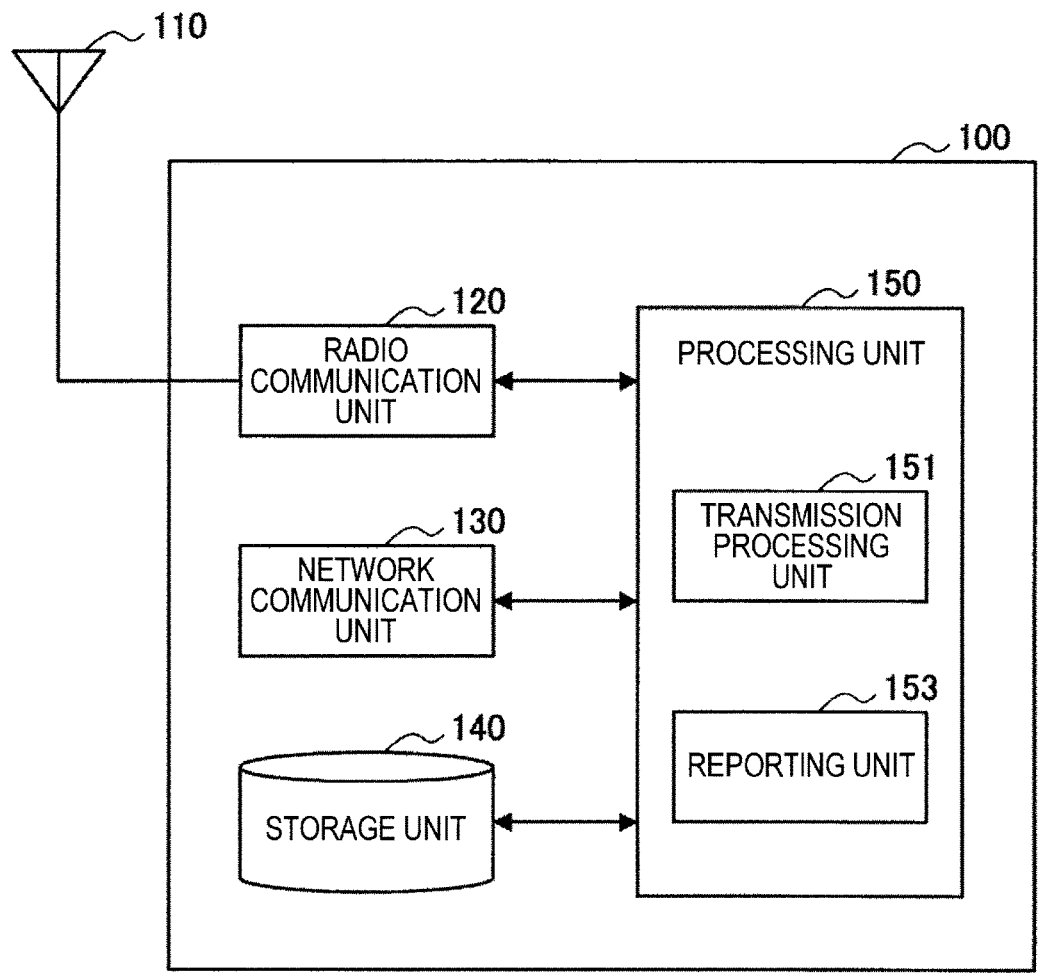

[Fig. 11]
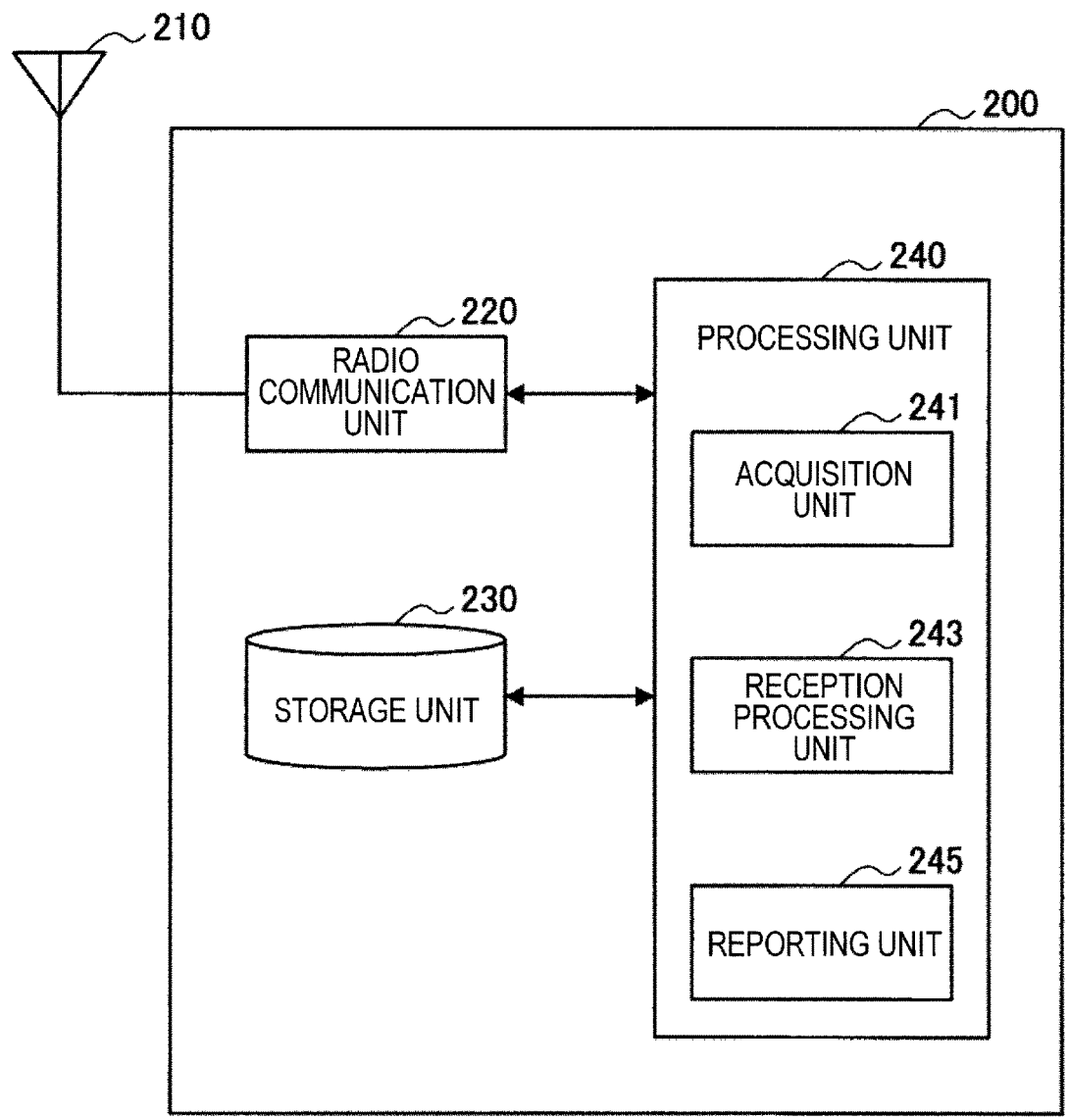

[Fig. 12]
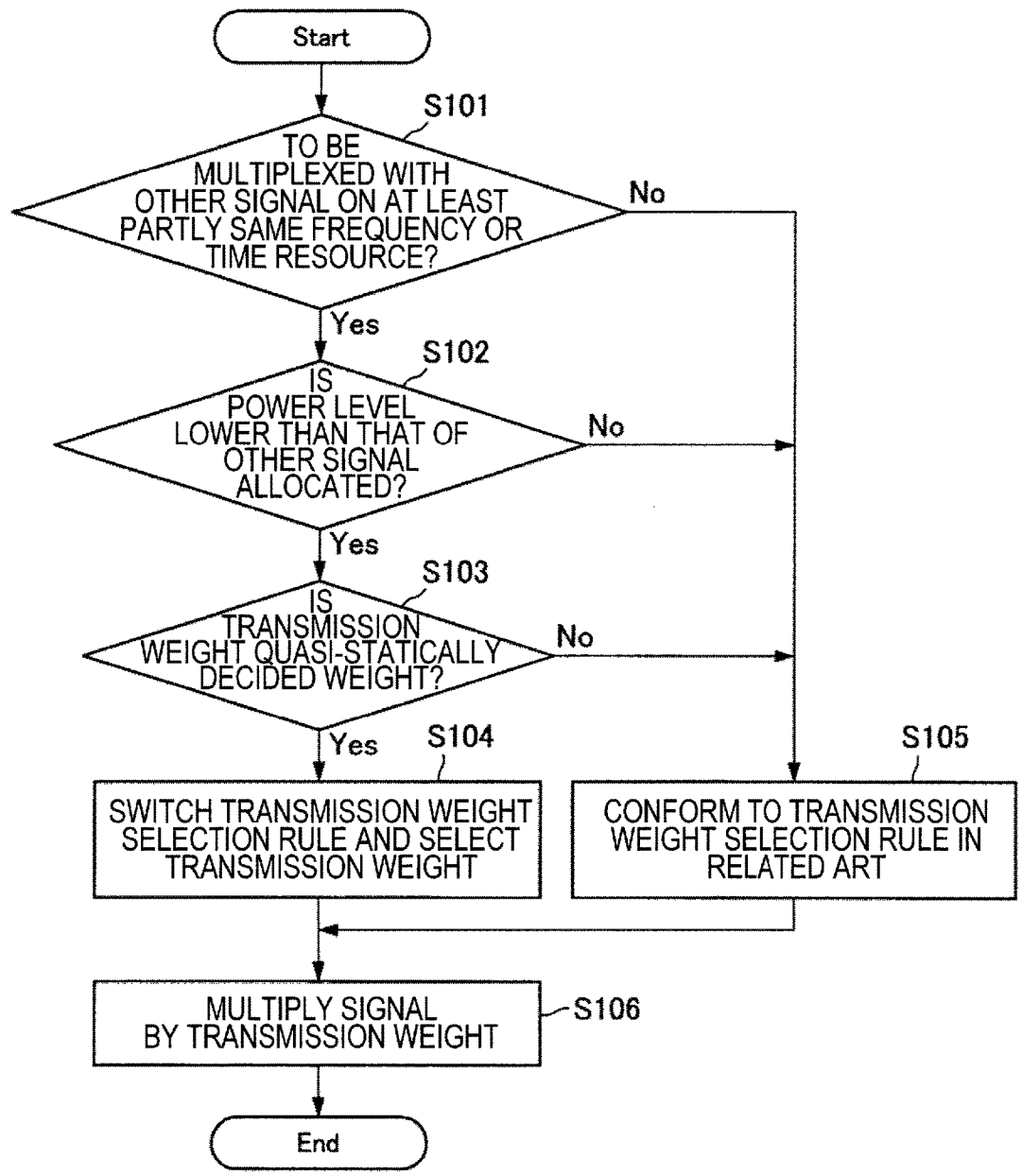

[Fig. 13]
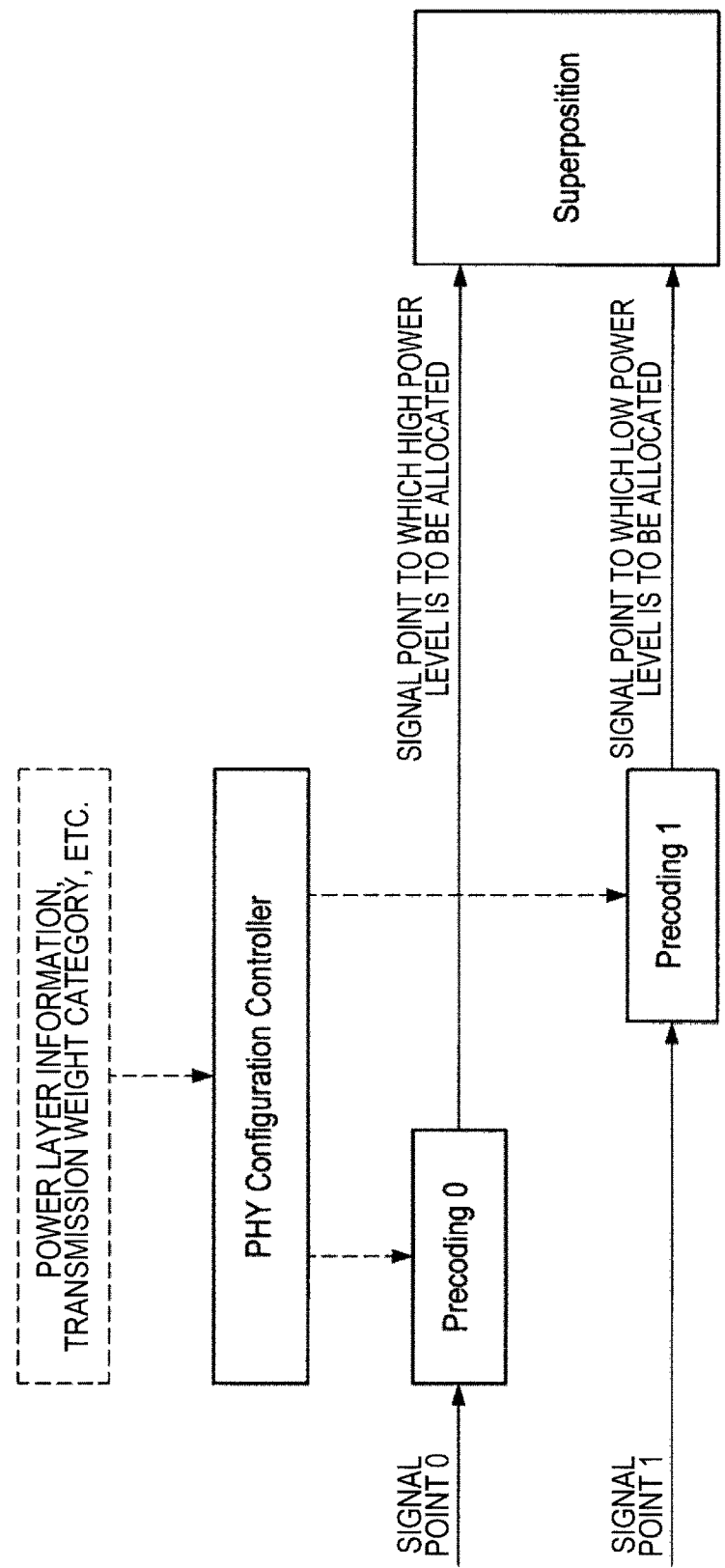

[Fig. 14]
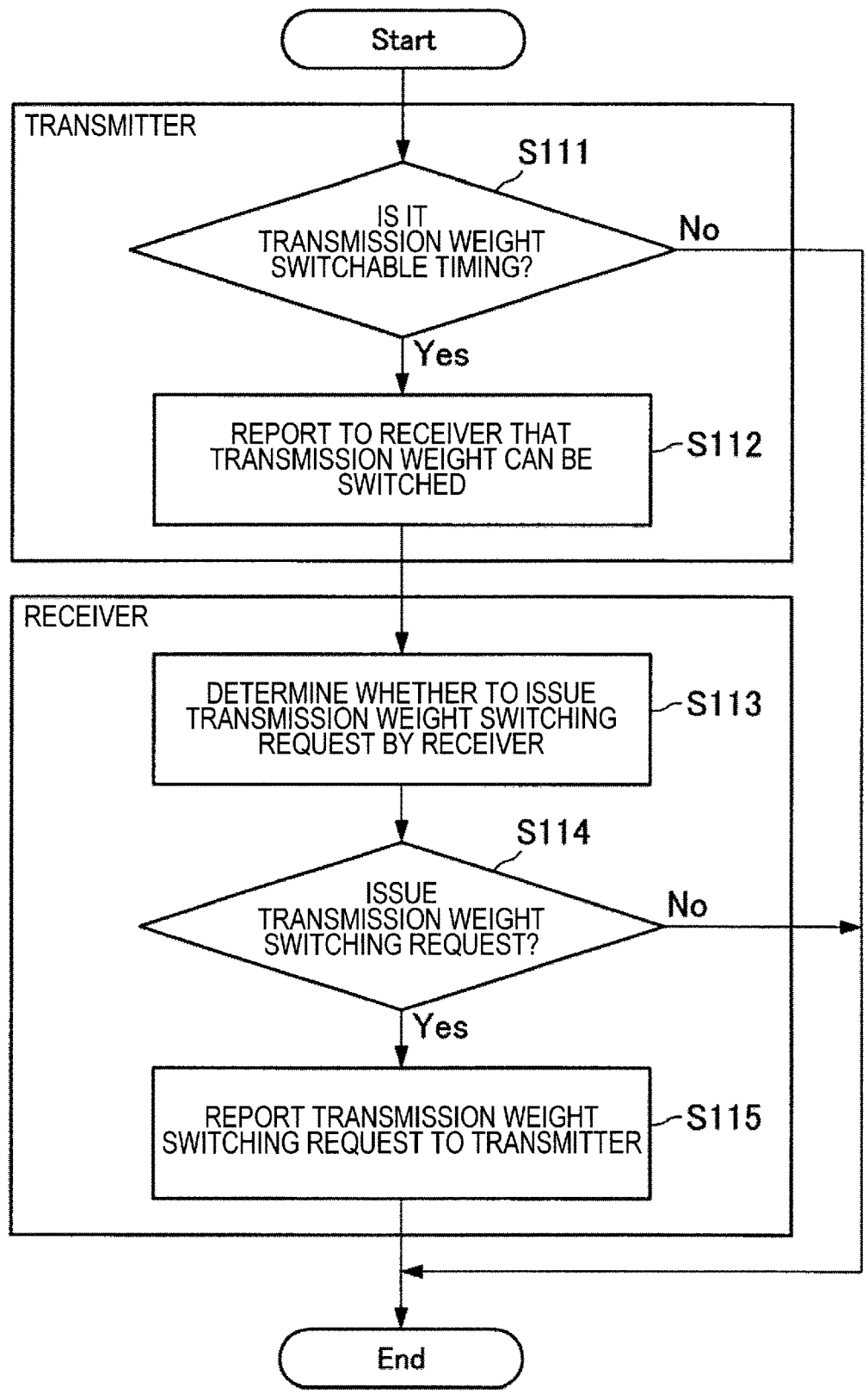

[Fig. 15]
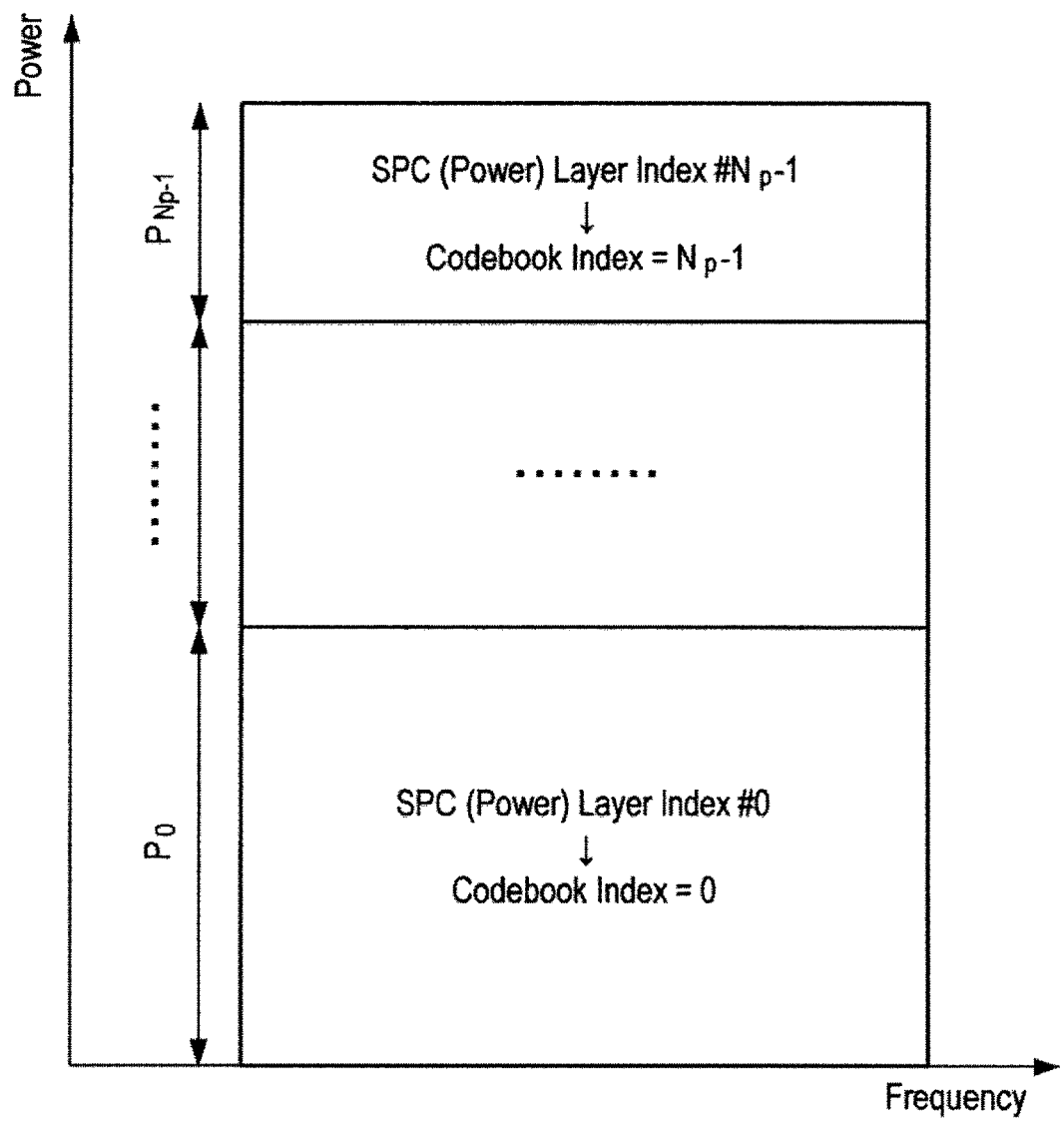

[Fig. 16]
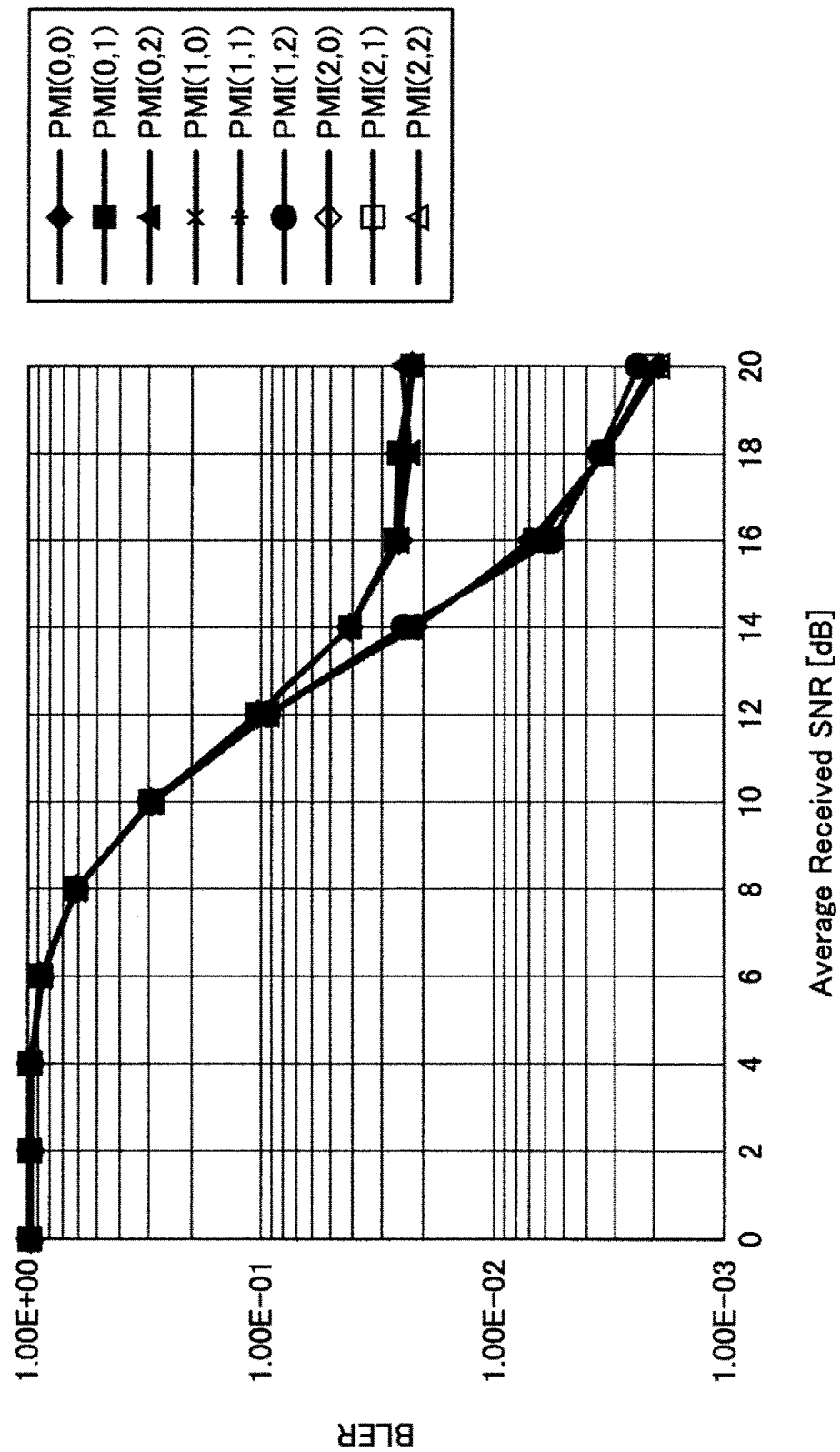

[Fig. 17]
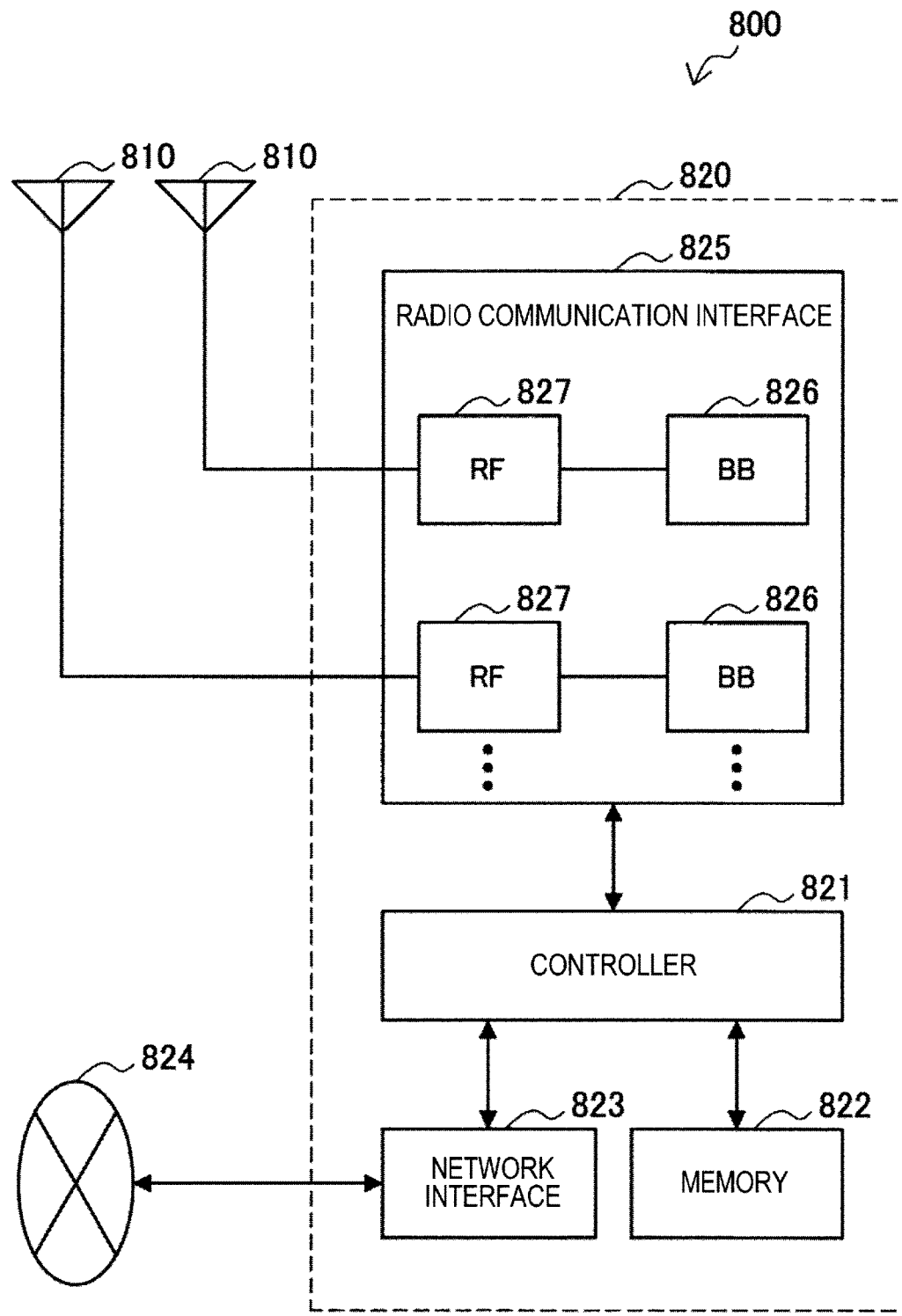

[Fig. 18]
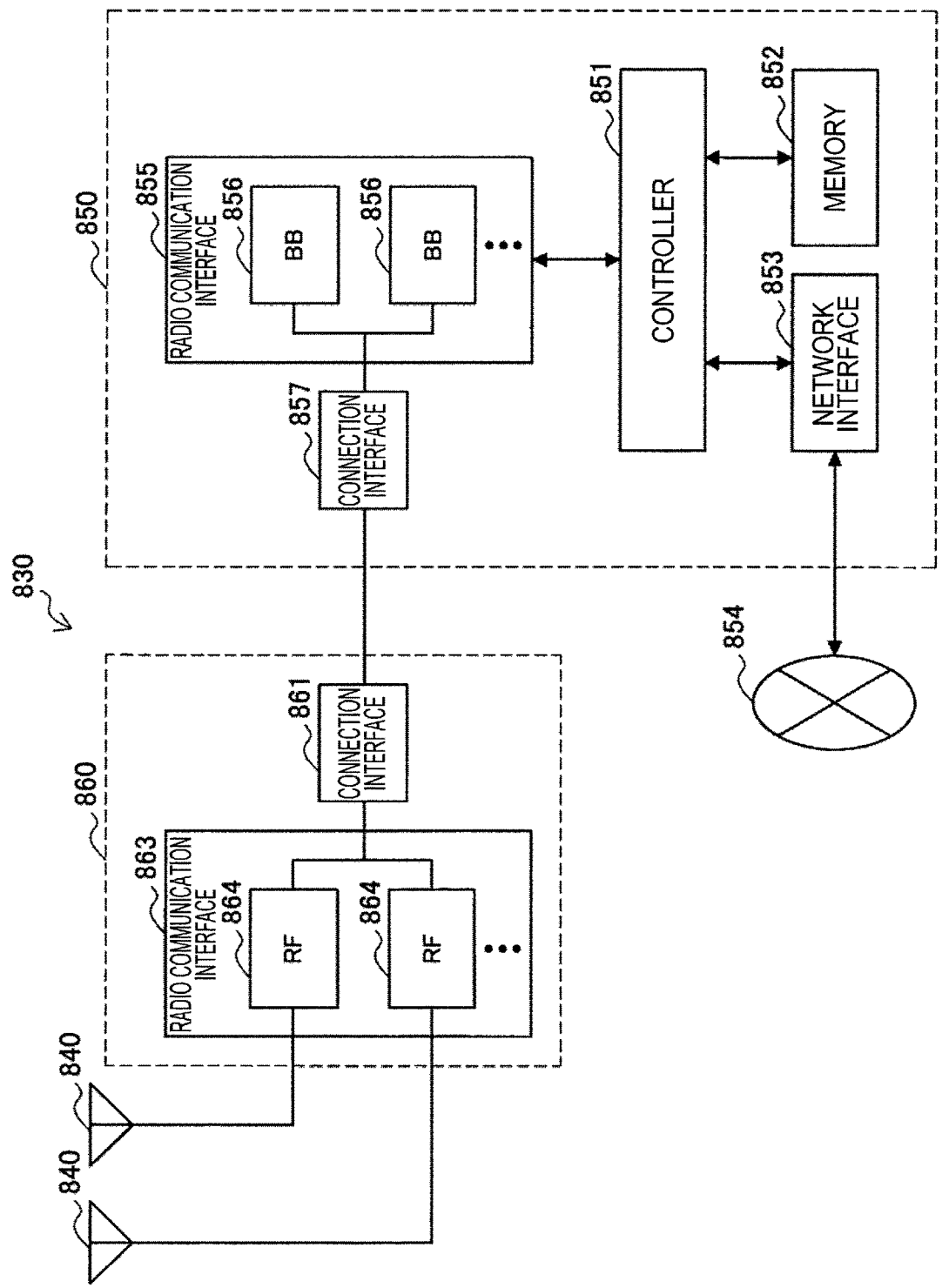

[Fig. 19]
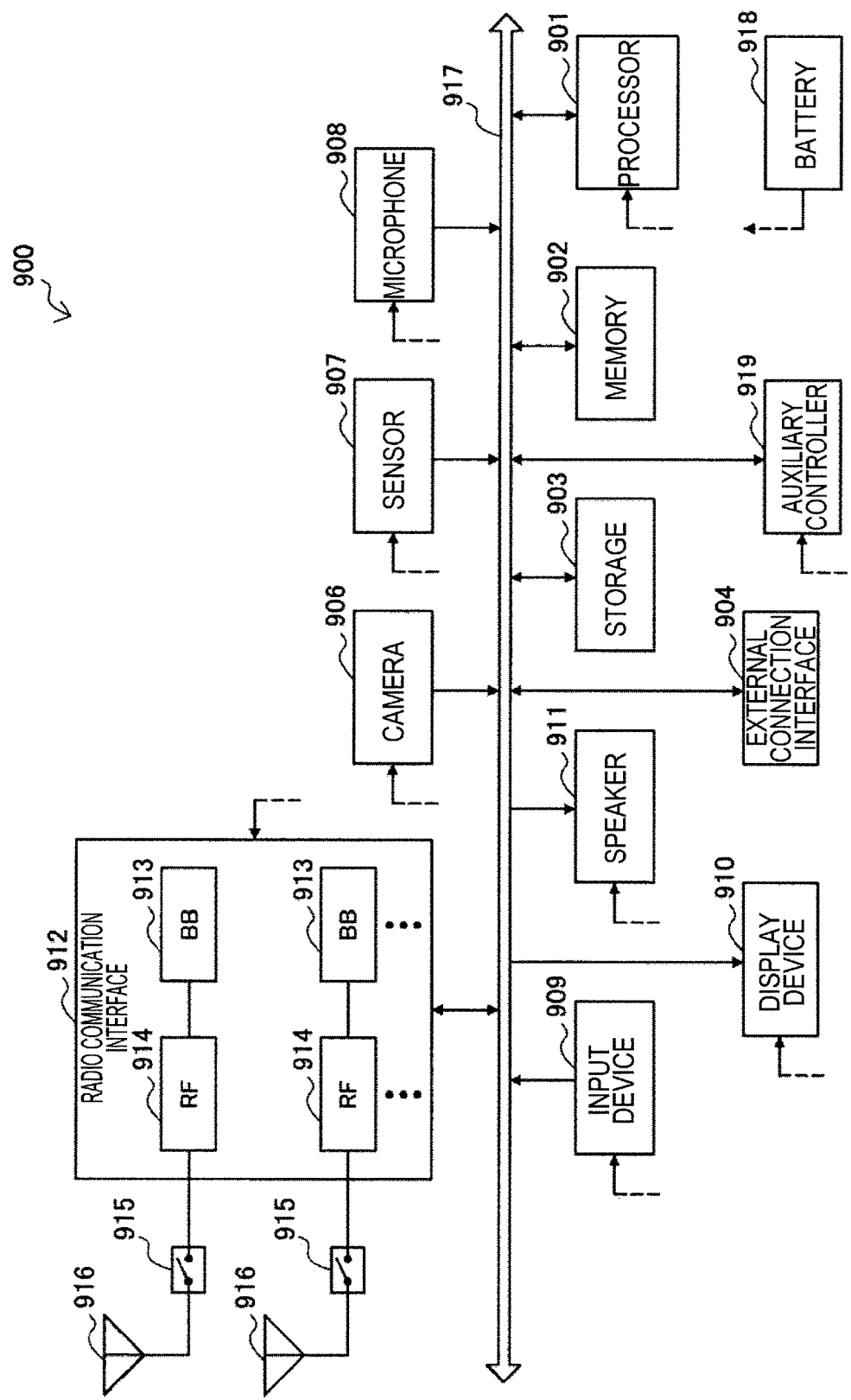

[Fig. 20]
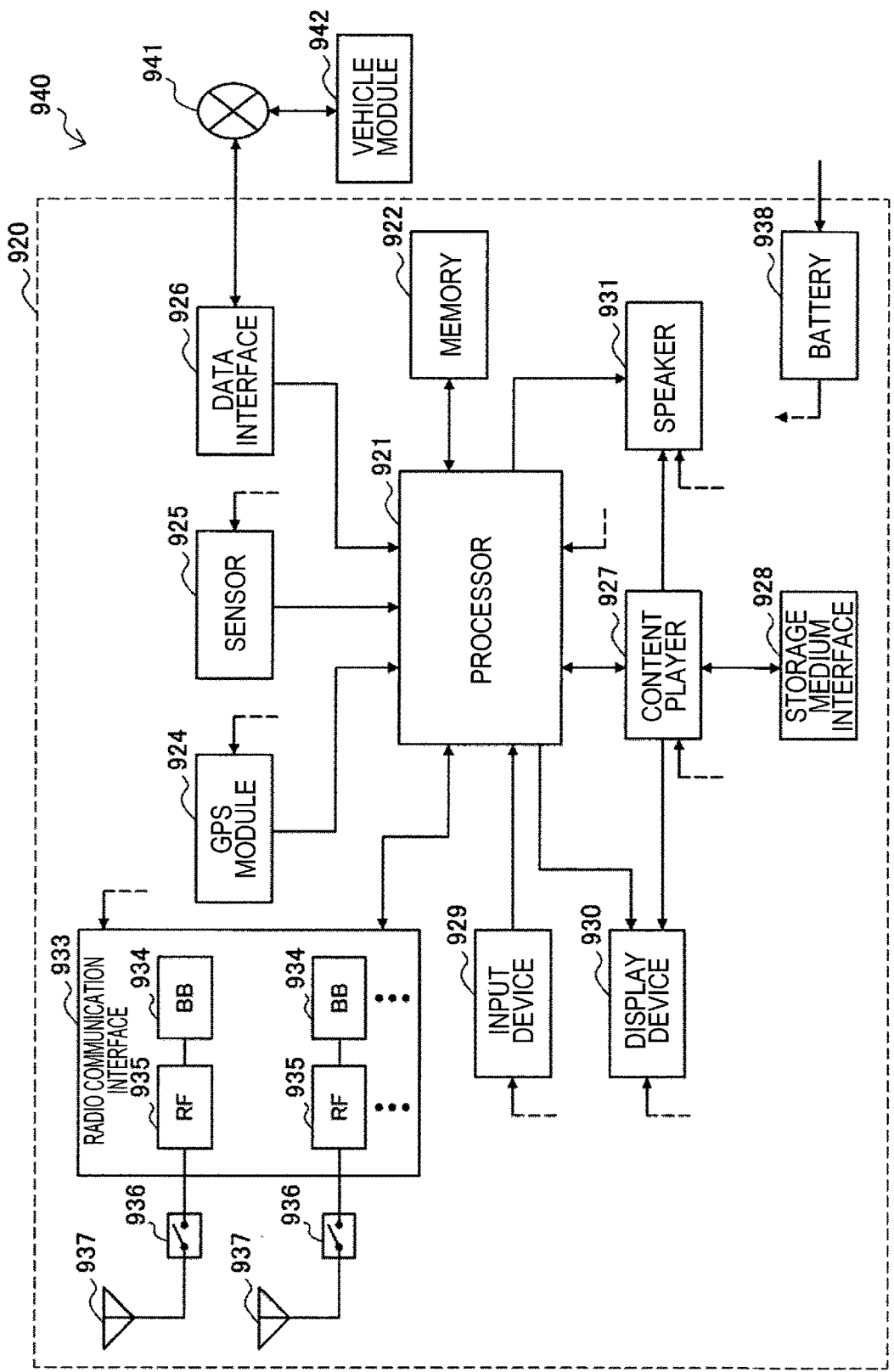

TRANSMISSION DEVICE AND RECEPTION DEVICE

CROSS REFERENCE TO RELATED APPLICATIONS

This application claims the benefit of Japanese Priority Patent Application JP 2015-215632 filed Nov. 2, 2015, the entire contents of which are incorporated herein by reference.

TECHNICAL FIELD

The present disclosure relates to a transmission device and a reception device.

BACKGROUND ART

Non-orthogonal multiple access (NOMA) has been attracting attention as a radio access technology (RAT) for a fifth generation (5G) mobile communication system following Long Term Evolution (LTE)/LTE-Advanced (LTE-A). In orthogonal frequency-division multiple access (OFDMA) and single-carrier frequency-division multiple access (SC-FDMA), which are adopted in LTE, radio resources (e.g., resource blocks) are allocated to users without overlap. These schemes are called orthogonal multiple access. In contrast, in non-orthogonal multiple access, radio resources are allocated to users with overlap. In non-orthogonal multiple access, signals of users interfere with each other, but a signal for each user is taken out by a high-precision decoding process at the reception side. Non-orthogonal multiple access, in theory, achieves higher cell communication capability than orthogonal multiple access.

One of radio access technologies classified into non-orthogonal multiple access is superposition coding (SPC) multiplexing/multiple access. SPC is a scheme in which signals to which different powers are allocated are multiplexed on at least partly overlapping radio resources in frequency and time. At the reception side, interference cancellation and/or iterative detection is performed for reception/decoding of signals multiplexed on the same radio resource.

For example, PTLs 1 and 2 disclose, as SPC or a technology equivalent to SPC, techniques for setting an amplitude (or power) that allows appropriate demodulation/decoding. Moreover, for example, PTL 3 discloses a technique for enhancing successive interference cancellation (SIC) for reception of multiplexed signals.

CITATION LIST

Patent Literature

PTL 1: JP 2003-78419A
PTL 2: JP 2003-229835A
PTL 3: JP 2013-247513A

SUMMARY

Technical Problem

In signal processing technologies using SPC, there has been a demand for an improvement in decoding precision of multiplexed signals (interference signal and desired signal) of a plurality of power layers.

Hence, the present disclosure proposes a novel and improved transmission device and reception device that can improve the precision of decoding for obtaining a desired signal in performing multiplexing/multiple access using power allocation.

Solution to Problem

According to an embodiment of the present disclosure, there is provided a transmission device that selects a transmission weight by which each of a plurality of signal points is to be multiplied; multiplies a signal corresponding to each of the plurality of signal points by the selected transmission weight; multiplexes the multiplied signals corresponding to each of the plurality of signal points on a same frequency and time resource; and modifies a selection rule corresponding to the transmission weight by which each of the plurality of signal points is to be multiplied.

According to an embodiment of the present disclosure, there is provided a device that acquires a report transmitted from a transmission device that selects a transmission weight by which each of a plurality of signal points is to be multiplied, multiplies a signal corresponding to each signal point by the selected transmission weight, and multiplexes and transmits the multiplied signals corresponding to each of the plurality of signal points on a same frequency and time resource, wherein the report includes information indicating a switchable timing of the transmission weight; and reports a switching request of the transmission weight to the transmission device upon acquiring the report including information indicating the switchable timing of the transmission weight

Advantageous Effects of Invention

According to an embodiment of the present disclosure, it is possible to provide a novel and improved transmission device and reception device that can improve the precision of decoding for obtaining a desired signal in performing multiplexing/multiple access using power allocation.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram for explaining an example of a process in a transmission device that supports SPC.

FIG. 2 is an explanatory diagram for explaining an example of a process in a transmission device that supports SPC.

FIG. 3 is an explanatory diagram for explaining an example of a process in a reception device that performs interference cancellation.

FIG. 4 is an explanatory diagram for explaining the necessity of interference cancellation in a reception device in NOMA/SPC.

FIG. 5 is an explanatory diagram illustrating an example of an overall configuration of a communication network to which an embodiment of the present disclosure may be applied.

FIG. 6 illustrates an example of a difference between a logical entity and a physical network device.

FIG. 7 is an explanatory diagram illustrating a network configuration in machine type communications (MTC).

FIG. 8 is an explanatory diagram illustrating a network configuration of HetNet and SCE, which are targeted for the present embodiment.

FIG. 9 is an explanatory diagram illustrating an example of the schematic configuration of a system 1 according to an embodiment of the present disclosure.

FIG. 10 explains an example of the configuration of a base station 100 according to an embodiment of the present disclosure.

FIG. 11 explains an example of the configuration of a terminal device 200 according to an embodiment of the present disclosure.

FIG. 12 is a flowchart illustrating an operation example of the base station 100 according to an embodiment of the present disclosure.

FIG. 13 is an explanatory diagram for explaining a method for selecting a transmission weight by the base station 100 according to an embodiment of the present disclosure.

FIG. 14 is a flowchart illustrating an operation example of the base station 100 (transmitter) and the terminal device 200 (receiver) according to an embodiment of the present disclosure.

FIG. 15 is an explanatory diagram illustrating an example of associating a codebook index with a power layer.

FIG. 16 is an explanatory diagram illustrating an example of reception characteristics for combinations of codebook indices.

FIG. 17 is a block diagram illustrating a first example of a schematic configuration of an eNB.

FIG. 18 is a block diagram illustrating a second example of the schematic configuration of the eNB.

FIG. 19 is a block diagram illustrating an example of a schematic configuration of a smartphone.

FIG. 20 is a block diagram illustrating an example of a schematic configuration of a car navigation device.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.
1. Embodiment of present disclosure
1.1. Overview
1.2. Configuration example
1.3. Operation example
2. Application examples regarding base stations
3. Application examples regarding terminal devices
4. Conclusion <1. Embodiment of Present Disclosure>
(1.1. Overview)
First, an overview of an embodiment of the present disclosure will be described. Firstly described with reference to the drawings are processes and signals of SPC.
(1) Process in Each Device
(a) Process in Transmission Device
FIGS. 1 and 2 are explanatory diagrams for explaining an example of a process in a transmission device that supports SPC. According to FIG. 1, for example, bit streams (e.g., transport blocks) of a user A, a user B, and a user C are processed. For each of these bit streams, some processes (e.g., cyclic redundancy check (CRC) encoding, forward error correction (FEC) encoding, rate matching, and scrambling/interleaving, as illustrated in FIG. 2) are performed and then modulation is performed. Further, layer mapping, power allocation, precoding, SPC multiplexing, resource element mapping, inverse discrete Fourier transform (IDFT)/inverse fast Fourier transform (IFFT), cyclic prefix (CP) insertion, digital-to-analog and radio frequency (RF) conversion, and the like are performed.

In particular, in power allocation, power is allocated to signals of the user A, the user B, and the user C, and in SPC multiplexing, the signals of the user A, the user B, and the user C are multiplexed.

(b) Process in Reception Device
FIG. 3 is an explanatory diagram for explaining an example of a process in a reception device that performs interference cancellation. According to FIG. 3, for example, RF and analog-to-digital conversion, CP removal, discrete Fourier transform (DFT)/fast Fourier transform (FFT), joint interference cancellation, equalization, decoding, and the like are performed. This provides bit streams (e.g., transport blocks) of the user A, the user B, and the user C.

(2) Transmission Signals and Reception Signals
(a) Downlink
Next, downlink transmission signals and reception signals when SPC is adopted will be described. Assumed here is a multi-cell system of heterogeneous network (HetNet), small cell enhancement (SCE), or the like.

An index of a cell to be in connection with a target user u is denoted by i, and the number of transmission antennas of a base station corresponding to the cell is denoted by $N_{TX,i}$. Each of the transmission antennas may also be called a transmission antenna port. A transmission signal from the cell i to the user u can be expressed in a vector form as below.

$$s_{i,u} = \begin{bmatrix} s_{i,u,0} \\ \vdots \\ s_{i,u,N_{TX,i}-1} \end{bmatrix} = W_{i,u} P_{i,u} x_{i,u} \quad [\text{Math. 1}]$$

$$W_{i,u} = \begin{bmatrix} w_{i,u,0,0} & \cdots & w_{i,u,0,N_{SS,u}-1} \\ \vdots & \ddots & \vdots \\ w_{i,u,N_{TX,i}-1,0} & \cdots & w_{i,u,N_{TX,i}-1,N_{SS,u}-1} \end{bmatrix} \quad [\text{Math. 2}]$$

$$P_{i,u} = \begin{bmatrix} P_{i,u,0,0} & \cdots & P_{i,u,0,N_{SS,u}-1} \\ \vdots & \ddots & \vdots \\ P_{i,u,N_{SS,u}-1,0} & \cdots & P_{i,u,N_{SS,u}-1,N_{SS,u}-1} \end{bmatrix} \quad [\text{Math. 3}]$$

$$x_{i,u} = \begin{bmatrix} x_{i,u,0} \\ \vdots \\ x_{i,u,N_{SS,u}-1} \end{bmatrix} \quad [\text{Math. 4}]$$

In the above expressions, $N_{SS,u}$ denotes the number of spatial transmission streams for the user u. Basically, $N_{SS,u}$ is a positive integer equal to or less than $N_{Tx,i}$. A vector $x_{i,u}$ is a spatial stream signal to the user u. Elements of this vector basically correspond to digital modulation symbols of phase shift keying (PSK), quadrature amplitude modulation (QAM), or the like. A matrix $W_{i,u}$ is a precoding matrix for the user u. An element in this matrix is basically a complex number, but may be a real number.

A matrix $P_{1,u}$ is a power allocation coefficient matrix for the user u in the cell i. In this matrix, each element is preferably a positive real number. Note that this matrix may be a diagonal matrix (i.e., a matrix whose components excluding diagonal components are zero) as below.

$$P_{i,u} = \begin{bmatrix} P_{i,u,0,0} & 0 & \cdots & 0 \\ 0 & P_{i,u,1,1} & \ddots & \vdots \\ \vdots & \ddots & \ddots & 0 \\ 0 & \cdots & \cdots & P_{i,u,N_{SS,u}-1,N_{SS,u}-1} \end{bmatrix}$$ [Math. 5]

If adaptive power allocation for a spatial stream is not performed, a scalar value $P_{i,u}$ may be used instead of the matrix $P_{i,u}$.

As well as the user u, another user v is present in the cell i, and a signal $s_{i,v}$ of the other user v is also transmitted on the same radio resource. These signals are multiplexed by SPC. A signal $s_i$ from the cell i after multiplexing is expressed as below.

$$s_i = \sum_{u' \in U_i} s_{i,u'}$$ [Math. 6]

In the above expression, $U_i$ denotes a set of users for which multiplexing is performed in the cell i. Also in a cell j (a cell that serves as an interference source for the user u) other than a serving cell of the user u, a transmission signal $s_j$ is generated similarly. Such a signal is received as interference at the user side. A reception signal $r_u$ of the user u can be expressed as below.

$$r_u = \begin{bmatrix} r_{u,0} \\ \vdots \\ r_{u,N_{RX,u}-1} \end{bmatrix} = \sum_{i'} H_{u,i'} s_{i'} + n_u$$ [Math. 7]

$$H_{u,i} = \begin{bmatrix} h_{u,i,0,0} & \cdots & h_{u,i,0,N_{TX,i}-1} \\ \vdots & \ddots & \vdots \\ h_{u,i,N_{RX,u}-1,0} & \cdots & h_{u,i,N_{RX,u}-1,N_{TX,i}-1} \end{bmatrix}$$ [Math. 8]

$$n_u = \begin{bmatrix} n_{u,0} \\ \vdots \\ n_{u,N_{RX,u}-1} \end{bmatrix}$$ [Math. 9]

In the above expressions, a matrix $H_{u,i}$ is a channel response matrix for the cell i and the user u. Each element of the matrix $H_{u,i}$ is basically a complex number. A vector $n_u$ is noise included in the reception signal $r_u$ of the user u. For example, the noise includes thermal noise and interference from another system. The average power of the noise is expressed as below.

$$\sigma_{n,u}^2$$ [Math.10]

The reception signal $r_u$ can also be expressed by a desired signal and another signal as below.

$$r_u = H_{u,i} s_{i,u} + H_{u,i} \sum_{v \in U_i, v \neq u} s_{i,v} + \sum_{j \neq i} H_{u,j} \sum_{v \in U_j} s_{j,v} + n_u$$ [Math. 11]

In the above expression, the first term of the right side denotes a desired signal of the user u, the second term, interference in the serving cell i of the user u (called intra-cell interference, multi-user interference, multi-access interference, or the like), and the third term, interference from a cell other than the cell i (called inter-cell interference).

When orthogonal multiple access (e.g., OFDMA or SC-FDMA) or the like is adopted, the reception signal can be expressed as below.

$$r_u = H_{u,i} s_{i,u} + \sum_{j \neq i} H_{u,j} s_{j,v} + n_u$$ [Math. 12]

In orthogonal multiple access, no intra-cell interference occurs, and moreover, in the other cell j, a signal of the other user v is not multiplexed on the same radio resource.

(b) Uplink

Next, uplink transmission signals and reception signals when SPC is adopted will be described. Assumed here is a multi-cell system of HetNet, SCE, or the like. Note that the signs used for downlink will be further used as signs denoting signals and the like.

A transmission signal that the user u transmits in the cell i can be expressed in a vector form as below.

$$s_{i,u} = \begin{bmatrix} s_{i,u,0} \\ \vdots \\ s_{i,u,N_{TX,u}-1} \end{bmatrix} = W_{i,u} P_{i,u} x_{i,u}$$ [Math. 13]

$$W_{i,u} = \begin{bmatrix} w_{i,u,0,0} & \cdots & w_{i,u,0,N_{SS,u}-1} \\ \vdots & \ddots & \vdots \\ w_{i,u,N_{TX,u}-1,0} & \cdots & w_{i,u,N_{TX,u}-1,N_{SS,u}-1} \end{bmatrix}$$ [Math. 14]

$$P_{i,u} = \begin{bmatrix} P_{i,u,0,0} & \cdots & P_{i,u,0,N_{SS,u}-1} \\ \vdots & \ddots & \vdots \\ P_{i,u,N_{SS,u}-1,0} & \cdots & P_{i,u,N_{SS,u}-1,N_{SS,u}-1} \end{bmatrix}$$ [Math. 15]

$$x_{i,u} = \begin{bmatrix} x_{i,u,0} \\ \vdots \\ x_{i,u,N_{SS,u}-1} \end{bmatrix}$$ [Math. 16]

In the above expressions, the number of transmission antennas is the number of transmission antennas of the user, $N_{TX,u}$. As in downlink, a matrix $P_{i,u}$, which is a power allocation coefficient matrix for the user u in the cell i, may be a diagonal matrix.

In uplink, there is no case where a signal of a user and a signal of another user are multiplexed in the user; thus, a reception signal of a base station of the cell i can be expressed as below.

$$r_i = \begin{bmatrix} r_{i,0} \\ \vdots \\ r_{i,N_{RX,i}-1} \end{bmatrix} = \sum_{i'} \sum_{u' \in U_{i'}} H_{i',u'} s_{i',u'} + n_i$$ [Math. 17]

$$H_{i,u} = \begin{bmatrix} h_{i,u,0,0} & \cdots & h_{i,u,0,N_{TX,u}-1} \\ \vdots & \ddots & \vdots \\ h_{i,u,N_{RX,i}-1,0} & \cdots & h_{i,u,N_{RX,i}-1,N_{TX,u}-1} \end{bmatrix}$$ [Math. 18]

-continued $$n_i = \begin{bmatrix} n_{i,0} \\ \vdots \\ n_{i,N_{RX,i}-1} \end{bmatrix}$$ [Math. 19]

It should be noted that in uplink, unlike in downlink, a base station needs to obtain all signals from a plurality of users in a cell by decoding. Note also that a channel response matrix differs depending on a user.

When a focus is put on a signal transmitted by the user u, among uplink signals in the cell i, a reception signal can be expressed as below.

$$r_{i,u} = \begin{bmatrix} r_{i,u,0} \\ \vdots \\ r_{i,u,N_{RX,i}-1} \end{bmatrix} =$$ [Math. 20]

$$H_{i,u}s_{i,u} + \sum_{v \in U_i, v \neq u} H_{i,v}s_{i,v} + \sum_{j \neq i} \sum_{v \in U_j} H_{i,v}s_{j,v} + n_i$$

In the above expression, the first term of the right side denotes a desired signal of the user u, the second term, interference in the serving cell i of the user u (called intra-cell interference, multi-user interference, multi-access interference, or the like), and the third term, interference from a cell other than the cell i (called inter-cell interference).

When orthogonal multiple access (e.g., OFDMA or SC-FDMA) or the like is adopted, the reception signal can be expressed as below.

$$r_{i,u} = H_{i,u}s_{i,u} + \sum_{j \neq i} H_{i,v}s_{j,v} + n_i$$ [Math. 21]

In orthogonal multiple access, no intra-cell interference occurs, and moreover, in the other cell j, a signal of the other user v is not multiplexed on the same radio resource.

(3) Background of Embodiment

Now, a background to an embodiment of the present disclosure will be described.

In SPC, in receiving and decoding signals multiplexed in a power domain with high precision, it is possible to use SIC in a reception-side device. In using SIC in the reception-side device, how to improve interference cancellation performance is important. Moreover, even if interference cancellation performance is insufficient, how to effectively utilize the performance of FEC decoding following the interference cancellation is of consequence. To improve such performance, in a transmission-side device, only using SPC in related art is insufficient and it is necessary to perform a process for efficiently melding interference cancellation and FEC decoding.

Furthermore, to achieve efficient interference cancellation and FEC decoding, it is preferable to consider also backward compatibility. In related art, PTL 2 discloses, as interference randomization for an interference cancellation effect, a technology of applying interleaving for each cell. However, the technology disclosed in PTL 2, in which technology all devices need to have SIC and interference cancellation functions, is disadvantageous in backward compatibility. In addition, an effect of interference cancellation between SPC-multiplexed signals cannot be expected from interleaving for each cell.

Moreover, in recent communication systems, importance is placed on multi-input multi-output (MIMO), which uses a plurality of antennas in a transmission device and a reception device. In the case of further applying SPC and an interleaving technology to a communication system adopting this MIMO, there is a need for multiplexing and interleaver selection including a spatial domain in addition to a power domain. Patent Literatures described above do not disclose this point, thus being insufficient in improving characteristics.

Hereinafter, basic power allocation in NOMA/SPC and an issue of a reception device will be described. FIG. 4 is an explanatory diagram for explaining the necessity of interference cancellation in a reception device in NOMA/SPC.

In NOMA/SPC, a plurality of signals are multiplexed by being given a power level difference on at least partly the same frequency resource and time resource. FIG. 4 illustrates a case where signals to two devices (Far UE and Near UE) in downlink are multiplexed with different powers.

In general, allocation of power levels is preferably set according to a relative relationship in path loss (alternatively, path gain or assumed reception quality (SINR)) between a transmission device and a reception device, taking into consideration the upper limit of the total transmission power of the transmission device. In the case of path loss, a high power is allocated to a signal to a device with large path loss (Far UE in FIG. 4), such as a farther device or a device that is outside a main lobe of antenna directivity, and a low power is allocated to a signal to a device with small path loss (Near UE in FIG. 4), such as a closer device or a device that is inside a main lobe of antenna directivity.

When signals are transmitted from a base station with a power level difference given in this way, signal-to-interference ratio (SIR) in NOMA/SPC is predicted to be 1 or more (0 dB or more) for Far UE, and 1 or less (0 dB or less) for Near UE. In other words, particularly in Near UE, it is necessary to perform interference cancellation, for example, on signals to Far UE serving as interference in order to obtain signals to Near UE itself by decoding.

In the case where SPC is performed, complex signal points (symbols) to be transmitted are multiplied by a transmission weight selected for each signal. The signals are multiplied by the transmission weights. Hence, how to decide a transmission weight in terms of interference cancellation characteristics seems to be an issue. In LTE, for example, in transmission mode (TM) 3, TM4, TM5, TM6, TM8 and TM9, a weight to be applied is selected from a transmission weight table of Table 1 or Table 2 to be used for calculation of a transmission weight. In SPC, however, interference occurs between multiplexed signals; thus, some combinations of selected transmission weights may lead to poor bit error rate characteristics.

TABLE 1

(Transmission weight table used in TM3 when the number of antenna ports is two)

| Codebook index | Number of layers υ | |
|---|---|---|
| | 1 | 2 |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |

TABLE 1-continued (Transmission weight table used in TM3 when the number of antenna ports is two)

| Codebook index | Number of layers $v$ | |
|---|---|---|
| | 1 | 2 |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

(Transmission weight table used when the number of antenna ports is 4)

| Codebook Index | $u_n$ | Number of layers $v$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

FIG. 5 is an explanatory diagram illustrating an example of an overall configuration of a communication network to which an embodiment of the present disclosure may be applied. "Device layer" in FIG. 5 includes, as well as a user terminal device, a communication device having a radio communication function, such as a base station device (e.g., NodeB (NB), eNB, or access point (AP)). Although not illustrated, the user terminal device and the base station device may be further classified into different layers. In that case, the base station device is preferably closer to a core network.

In the configuration example of the communication network illustrated in FIG. 5, the user terminal device belonging to the device layer uses a service provided by an application server device via a network. A logical session can be considered as communication between the user terminal device and the application server device.

On the other hand, from the view point of connection between network layers, a network configuration can be considered in addition to the logical session. For example, in the case where a communication device in the device layer constitutes a cellular system, one or more base station devices are connected to a control/user data network of the cellular system, which is called a core network. Further, they are connected to a public Internet Protocol (IP) network via a gateway device in the core network. Meanwhile, the application server device can be considered as one element that constitutes a service platform together with a plurality of other servers, as in a cloud system. In such a case, a communication device corresponding to a gateway may be installed at the service platform side to serve a function in establishing connection with the public IP network.

The core network, the IP network, and the service platform may further include, as physical communication devices, a virtualization device that virtualizes a network (e.g., a router, a switch, and a router/switch), a network virtualization control device, and a cable. FIG. 6 illustrates an example of a difference between a logical entity and a physical network device. For example, there is an interface called X2 interface between base station devices. It should be noted that this is a logical interface, and the base station devices are actually not necessarily in direct physical connection. They may actually be connected physically via a plurality of entities.

A radio access technology (RAT) targeted for an embodiment of the present disclosure is a technology for radio connection particularly between communication devices belonging to the device layer in the configuration example of the network illustrated in FIG. 5.

FIG. 7 is an explanatory diagram illustrating a network configuration in machine type communications (MTC), which is another example of a communication network configuration. The RAT in an embodiment of the present disclosure corresponds to an access scheme used in a radio access network (RAN) in the drawing. A user equipment (UE) corresponds to the terminal device, and it is assumed that an MTC application is operating on the UE. The base station device is not explicit in FIG. 7, but is assumed to be present in the RAN in connection with the UE.

A "home public land mobile network (HPLMN)" and a "visited public land mobile network (VPLMN)" in FIG. 7 indicate a configuration for roaming between different common carriers. The HPLMN is a network on the common carrier side to which the target communication device (e.g., UE) originally belongs, and the VPLMN corresponds to a network that is a roaming destination of the communication device. Although omitted from FIG. 7, a public IP network may serve as a relay between the HPLMN and the VPLMN. During roaming, as illustrated in FIG. 7, particularly data of a control plane is relayed from the VPLMN to an entity in the HPLMN. This is because control information of the target UE needs to be managed on the home common carrier side. Meanwhile, data of a user plane is relayed from a gateway on the VPLMN side to a gateway on the HPLMN side and then relayed and transferred to an application server (the data may go through an entity of a public IP network or a service platform). In normal operation without roaming, there is no HPLMN/VPLMN boundary.

In the case where an application server provides a service, it is possible to further install a service capability server (SCS) to appropriately select a service that can be provided. For example, in providing a service, if it is necessary to carry out monitoring and sensing for a target UE beforehand, the SCS may request a trigger therefor from the UE so that provision of the service can be smoothly started. The SCS is not necessary for all application servers, and for example, as illustrated in FIG. 7, it is possible to adopt a hybrid configuration in which an application server accompanied by a SCS and an application server not accompanied by a SCS are used in accordance with a service to be provided.

FIG. 8 is an explanatory diagram illustrating a network configuration of HetNet and SCE, which are targeted for the present embodiment. Lines shown by the broken lines in FIG. 8 indicate logical connection, and do not necessarily indicate direct physical connection.

A communication area includes "cells", indicated by ovals in FIG. 8, in which a plurality of base stations each provide a service. One base station may provide a plurality of cells. FIG. 8 illustrates a macro cell base station 40 and a small cell base station 50. The macro cell base station 40 covers a macro cell area 41, and the small cell base station 50 covers a small cell area 51 that is narrower than the macro cell area 41. In the following description, the macro cell base station 40 and the small cell base station 50 are collectively described as "base stations" in some cases.

A base station can communicate with other base stations via a backhaul, and mainly exchanges control information. The backhaul may be either wired or wireless. This backhaul may adopt information exchange using a protocol of X2 interface or S1 interface, for example.

The base station also has a backhaul to a core network 33 of a system. The base station may be connected to a control entity 34 to be brought into connection with the core network 33. In other words, the control entity 34 may be regarded as an element of the core network 33. Further, the base station may be connected to the core network 33 via an external network 30 and a gateway device 31, as well as via the control entity 34. Examples of such a case are a femtocell base station device and a Home eNB (HeNB) device, which can be installed in a room or in a household. The femtocell base station device or HeNB device may be connected to the external network 30 via a HeNB gateway device 32, for example.

The small cell area 51 is basically arranged to overlap with the macro cell area 41. Alternatively, the small cell area 51 may be partially the same as the macro cell area 41 or arranged completely outside the macro cell area 41.

A macro cell and a small cell may have a characteristic in radio resources to be used. For example, the macro cell and the small cell may use the same frequency resource F1 (or time resource T1). The macro cell and the small cell using the same frequency resource F1 (or time resource T1) can improve radio resource use efficiency of the entire system.

It is also possible for the macro cell to use the frequency resource F1 (or time resource T1) and the small cell to use a frequency resource F2 (or time resource T2). The macro cell and the small cell using different frequency resources (or time resources) can allow interference between the macro cell and the small cell to be avoided. Further alternatively, both kinds of cells may use F1/2 (T1/2). This is an idea equivalent to carrier aggregation (CA) when applied particularly to frequency resources.

(1.2. Configuration Example)

Now, a schematic configuration of a system 1 according to an embodiment of the present disclosure will be described with reference to FIG. 9. FIG. 9 is an explanatory diagram illustrating an example of the schematic configuration of the system 1 according to an embodiment of the present disclosure. According to FIG. 9, the system 1 includes a base station 100 and a terminal device 200. Here, the terminal device 200 is also called a user. The user may also be called a user equipment (UE). Here, the UE may be a UE defined in LTE or LTE-A, or may generally refer to communication equipment.

(1) Base Station 100

The base station 100 is a base station of a cellular system (or mobile communication system). The base station 100 performs radio communication with a terminal device (e.g., the terminal device 200) located in a cell 10 of the base station 100. For example, the base station 100 transmits a downlink signal to the terminal device, and receives an uplink signal from the terminal device.

(2) Terminal Device 200

The terminal device 200 can perform communication in a cellular system (or mobile communication system). The terminal device 200 performs radio communication with a base station (e.g., the base station 100) of the cellular system. For example, the terminal device 200 receives a downlink signal from the base station, and transmits an uplink signal to the base station.

(3) Multiplexing/Multiple Access

In particular, in an embodiment of the present disclosure, the base station 100 performs radio communication with a plurality of terminal devices by non-orthogonal multiple access. Specifically, the base station 100 performs radio communication with the plurality of terminal devices by multiplexing/multiple access using power allocation. For example, the base station 100 performs radio communication with the plurality of terminal devices by multiplexing/ multiple access using SPC.

For example, the base station 100 performs radio communication with the plurality of terminal devices by multiplexing/multiple access using SPC in downlink. Specifically, for example, the base station 100 multiplexes signals to the plurality of terminal devices using SPC. In this case, for example, the terminal device 200 removes one or more other signals, as interference, from a multiplexed signal including a desired signal (i.e., a signal to the terminal device 200), and decodes the resulting signal into the desired signal.

Note that the base station 100 may perform radio communication with the plurality of terminal devices by multiplexing/multiple access using SPC in uplink, instead of or together with downlink. In this case, the base station 100 may decode a multiplexed signal including signals transmitted from the plurality of terminal devices into the signals.

Now, configurations of the base station 100 and the terminal device 200 according to an embodiment of the present disclosure will be described with reference to FIGS. 10 and 11.

First, an example of the configuration of the base station 100 according to an embodiment of the present disclosure will be described with reference to FIG. 10. FIG. 10 is a block diagram illustrating the example of the configuration of the base station 100 according to an embodiment of the present disclosure. According to FIG. 10, the base station 100 includes an antenna unit 110, a radio communication unit 120, a network communication unit 130, a storage unit 140, and a processing unit 150.

(1) Antenna Unit 110

The antenna unit 110 radiates signals output by the radio communication unit 120 out into space as radio waves. In addition, the antenna unit 110 converts radio waves in the space into signals, and outputs the signals to the radio communication unit 120.

(2) Radio Communication Unit 120

The radio communication unit 120 transmits and receives signals. For example, the radio communication unit 120 transmits a downlink signal to a terminal device, and receives an uplink signal from a terminal device.

(3) Network Communication Unit 130

The network communication unit 130 transmits and receives information. For example, the network communication unit 130 transmits information to other nodes, and receives information from other nodes. For example, the other nodes include another base station and a core network node.

(4) Storage Unit 140

The storage unit 140 temporarily or permanently stores a program and various data for operation of the base station 100.

(5) Processing Unit 150

The processing unit 150 provides various functions of the base station 100. The processing unit 150 includes a transmission processing unit 151 and a reporting unit 153. Note that the processing unit 150 may further include a structural element other than these structural elements. That is, the processing unit 150 may perform operation other than the operation of these structural elements.

The operation of the transmission processing unit 151 and the reporting unit 153 will be described in detail later.

Next, an example of the configuration of the terminal device 200 according to an embodiment of the present disclosure will be described with reference to FIG. 11. FIG. 11 is a block diagram illustrating the example of the configuration of the terminal device 200 according to an embodiment of the present disclosure. According to FIG. 11, the terminal device 200 includes an antenna unit 210, a radio communication unit 220, a storage unit 230, and a processing unit 240.

(1) Antenna Unit 210

The antenna unit 210 radiates signals output by the radio communication unit 220 out into space as radio waves. In addition, the antenna unit 210 converts radio waves in the space into signals, and outputs the signals to the radio communication unit 220.

(2) Radio Communication Unit 220

The radio communication unit 220 transmits and receives signals. For example, the radio communication unit 220 receives a downlink signal from a base station, and transmits an uplink signal to a base station.

(3) Storage Unit 230

The storage unit 230 temporarily or permanently stores a program and various data for operation of the terminal device 200.

(4) Processing Unit 240

The processing unit 240 provides various functions of the terminal device 200. The processing unit 240 includes an acquisition unit 241, a reception processing unit 243, and a reporting unit 245. Note that the processing unit 240 may further include a structural element other than these structural elements. That is, the processing unit 240 may perform operation other than the operation of these structural elements.

The operation of the acquisition unit 241, the reception processing unit 243, and the reporting unit 245 will be described in detail later.

(1.3. Operation Example)

Now, an operation example of the base station 100 and the terminal device 200 according to an embodiment of the present disclosure will be described.

(1) Method for Selecting Transmission Weights by which Signals to be SPCMultiplexed are to be Multiplied First, description is given on how the base station 100 selects transmission weights by which signals to be SPC-multiplexed (i.e., to be multiplexed by being given a power level difference on at least partly the same frequency resource and time resource) are to be multiplied.

FIG. 12 is a flowchart illustrating an operation example of the base station 100 according to an embodiment of the present disclosure. The flowchart in FIG. 12 illustrates a method for selecting transmission weights by which signals to be SPC-multiplexed are to be multiplied. Hereinafter, the operation example of the base station 100 according to an embodiment of the present disclosure will be described using FIG. 12. In the following description, the number of signals to be multiplexed is assumed to be two. The flowchart in FIG. 12 is the operation example of the base station 100 when one of the two signals to be multiplexed is targeted for switching of a transmission weight selection rule.

The base station 100 determines whether a target signal is a signal to be multiplexed with another signal on at least partly the same frequency or time resource (step S101). The process of step S101 is executed by the transmission processing unit 151, for example.

When it is determined in step S101 that the target signal is a signal to be multiplexed with another signal on at least partly the same frequency or time resource (step S101, Yes), the base station 100 then determines whether a power level lower than that of the other signal is allocated to the target signal (step S102). The process of step S102 is executed by the transmission processing unit 151, for example.

When it is determined in step S102 that a power level lower than that of the other signal is allocated to the target signal (step S102, Yes), the base station 100 then determines whether a transmission weight by which the target signal is to be multiplied is a quasi-statically decided weight (step S103). The process of step S103 is executed by the transmission processing unit 151, for example. Whether a transmission weight is a quasi-statically decided weight means whether the transmission weight is a weight decided as shown in Table 1, for example.

When it is determined in step S103 that a transmission weight by which the target signal is to be multiplied is a quasi-statically decided weight (step S103, Yes), the base station 100 then switches the transmission weight selection rule and selects a transmission weight by which the signal is to be multiplied (step S104). The process of step S104 is executed by the transmission processing unit 151, for example.

When the results of determination in steps S101 to S103 are negative, the base station 100 decides to conform to a transmission weight selection rule in related art (step S105).

Finally, the base station 100 multiplies a transmission signal by a transmission weight selected in step S104 or a transmission weight decided according to the transmission weight selection rule in related art decided in step S105 (step S106). The process of step S106 is executed by the transmission processing unit 151, for example.

Now, description is given on a method for selecting a transmission weight in step S104 when it has been decided to switch the transmission weight selection rule. Switching of a selection rule may be, for example, switching of a rule in accordance with power layer information or a state (e.g., transmission weight category) of the other signal to be multiplexed.

FIG. 13 is an explanatory diagram for explaining a method for selecting a transmission weight by the base station 100 according to an embodiment of the present disclosure. FIG. 13 illustrates an example of switching a conversion rule in accordance with a state of a signal constellation of signals to be multiplexed. Illustrated in FIG. 13 is a case of selecting transmission weights for two signal points 0 and 1. The signal point 0 is a signal point to which a high power level is to be allocated, and the signal point 1 is a signal point to which a low power level is to be allocated. To these two signal points, transmission weights are given through Precoding 0 and Precoding 1.

A specific example of new transmission weight selection is as follows. For example, in Transmission Mode 3 when the number of antenna ports is two, as in Table 1, a transmission weight of Codebook Index=0 is selected based on a transmission weight selection rule of LTE, whereas in a new transmission weight selection rule, a transmission weight of Codebook Index=1, for example, can also be selected as well as Codebook Index=0.

As another example of new transmission weight selection, in Transmission Mode 4 when the number of antenna ports is two, Codebook Index=1 or 2 is selected, whereas 0, for example, can also be selected in a new transmission weight selection rule as with the aforementioned example.

In selecting a transmission weight, the base station 100 may dynamically decide or statically define a transmission weight to be selected. In the case of dynamically deciding the transmission weight, the base station 100 should report which transmission weight has been selected to a receiver (the terminal device 200); accordingly, the base station 100 reports an index of a selected transmission weight to a target receiver through RRC signaling, system information, downlink control information, or the like. This reporting is executed by the reporting unit 153. The base station 100 may report an index of a selected transmission weight every time selection is performed, or may determine a timing when a transmission weight can be switched, and perform switching only at the timing and report the index to the target receiver.

The base station 100 may switch a transmission weight at a random timing, or on the basis of communication quality feedback from the receiver. Alternatively, the base station 100 may switch a transmission weight at constant timings, for example, every frame, or at a timing when a decoding error (e.g., CRC error) occurs at the receiver side. Alternatively, the base station 100 may switch a transmission weight at a timing of retransmission, or at a timing when a change of a predetermined value or more occurs in a distance to the receiver according to position information on the receiver.

FIG. 14 is a flowchart illustrating an operation example of the base station 100 (transmitter) and the terminal device 200 (receiver) according to an embodiment of the present disclosure. FIG. 14 illustrates an operation example of the base station 100 and the terminal device 200 when the base station 100 switches a transmission weight. Hereinafter, the operation example of the base station 100 and the terminal device 200 according to an embodiment of the present disclosure will be described with reference to FIG. 14.

First, the base station 100 determines whether it is a timing for switching a transmission weight (step S111). The determination in step S111 is performed by the transmission processing unit 151. The base station 100 determines whether it is a timing for switching a transmission weight based on whether it is the above-described timing, for example. Note that the base station 100 may skip the determination in step S111 in the case of switching a transmission weight at a random timing.

When it is determined in step S111 that it is a timing for switching a transmission weight (step S111, Yes), the base station 100 then reports to the receiver (the terminal device 200) that it is a timing when a transmission weight can be switched (step S112). The process of step S112 is performed by the reporting unit 153.

The receiver (the terminal device 200) that has received the report from the base station 100 determines whether to issue a transmission weight switching request (step S113). The process of step S113 is executed by the reception processing unit 243.

Then, following the process of step S113, the receiver (the terminal device 200) determines whether to issue a transmission weight switching request to the base station 100 (step S114). When having determined to issue a transmission weight switching request to the base station 100 (step S114, Yes), the receiver reports the transmission weight switching request to the base station 100 (step S115). The determination process in step S114 may be executed by the reception processing unit 243, for example. The reporting process in step S115 may be executed by the reporting unit 245, for example. The receiver may decide to issue a transmission weight switching request based on the quality of a signal transmitted from the base station 100, or at a timing when a decoding error of a received signal occurs. The receiver may report the transmission weight switching request as part of RRC signaling or as part of uplink control information.

When the base station 100 determines in step S111 that it is not a timing for switching a transmission weight (step S111, No) or when, following the process of step S113, the terminal device 200 determines not to issue a transmission weight switching request to the base station 100 (step S114, No), the base station 100 or the terminal device 200 skips the subsequent processes.

On the other hand, in the case of statically defining the transmission weight, the base station 100 may, for example, associate a codebook index with a power layer. In such a case, there is no need for the base station 100 to report information on a transmission weight to the receiver. FIG. 15 is an explanatory diagram illustrating an example of associating a codebook index with a power layer.

In the case where two signals are to be multiplexed, the base station 100 may uniquely decide a codebook index according to information indicating a low power level. For example, in NOMA SPC, a receiver that receives a signal to which a low power level has been allocated will receive a report on information indicating that a process such as interference cancellation should be performed, through RRC signaling, system information, downlink control information, or the like. In this case, by deciding beforehand that a receiver that has received the report uses a unique value (e.g., Codebook Index=1) other than a value used in related art as a codebook index, it is possible to use different transmission weights without newly adding a process of reporting information on a transmission weight.

Furthermore, the base station 100 may select a transmission weight, from among a plurality of quasi-statically selected transmission weights, based on a transmission weight by which a signal point other than the target signal point is to be multiplied. For example, the base station 100 may select a transmission weight to be applied to a signal with a low power level based on information on a transmission weight to be applied to a signal with a high power level. For example, the base station 100 makes a decision in such a way that if a codebook index of a transmission weight to be applied to a signal with a high power level is 0, a codebook index of a transmission weight to be applied to a signal with a low power level is 1.

FIG. 16 is an explanatory diagram illustrating an example of reception characteristics for combinations of codebook indices when SPC is applied to two UEs. In the example of FIG. 16, the two UEs are both in TM3 and use SPC. In FIG. 16, Precoding Matrix Indicator (PMI) is shown as a codebook index. The horizontal axis of FIG. 16 indicates average received SNR [dB] in a user to which a low power level has been allocated, and the vertical axis indicates block error rate (BLER) characteristics.

In FIG. 16, PMI is shown as PMI(A,B). "A" denotes a codebook index to be applied to a signal with a low power level, and "B" denotes a codebook index to be applied to a signal with a high power level.

As shown in FIG. 16, some combinations of codebook indices in SPC lead to poor error rate characteristics. That is, applying the switching of the transmission weight selection rule of the present embodiment in SPC serves as a remedy for poor error rate characteristics.

<2. Application Examples Regarding Base Stations>

(First Application Example)

FIG. 17 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 17. For example, the multiple antennas 810 may be compatible with multiple frequency bands used by the eNB 800. Although FIG. 17 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 17. For example, the multiple BB processors 826 may be compatible with multiple frequency bands used by the eNB 800. The radio communication interface 825 may include the multiple RF circuits 827, as illustrated in FIG. 17. For example, the multiple RF circuits 827 may be compatible with multiple antenna elements. Although FIG. 17 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 17, one or more structural elements included in the processing unit 150 (the transmission processing unit 151 and/or the reporting unit 153) described with reference to FIG. 10 may be implemented by the radio communication interface 825. Alternatively, at least some of these constituent elements may be implemented by the controller 821. As an example, a module which includes a part (for example, the BB processor 826) or all of the radio communication interface 825 and/or the controller 821 may be mounted in eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the radio communication interface 825 (for example, the BB processor 826) and/or the controller 821 may execute the program. As described above, the eNB 800, the base station device 820, or the module may be provided as a device which includes the one or more structural elements, and the program for causing the processor to function as the one or more structural elements may be provided. In addition, a readable recording medium in which the program is recorded may be provided.

In addition, in the eNB 800 shown in FIG. 17, the radio communication unit 120 described with reference to FIG. 10 may be implemented by the radio communication interface 825 (for example, the RF circuit 827). Moreover, the antenna unit 110 may be implemented by the antenna 810. In addition, the network communication unit 130 may be implemented by the controller 821 and/or the network interface 823. The storage unit 140 may be implemented by the memory 822.

(Second Application Example)

FIG. 18 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 18. For example, the multiple antennas 840 may be compatible with multiple frequency bands used by the eNB 830. Although FIG. 18 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 17.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 17, except the BB processor 856 is connected to the RF circuit 864 of the RRH 860 via the connection interface 857. The radio communication interface 855 may include the multiple BB processors 856, as illustrated in FIG. 18. For example, the multiple BB processors 856 may be compatible with multiple frequency bands used by the eNB 830. Although FIG. 18 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 18. For example, the multiple RF circuits 864 may support multiple antenna elements. Although FIG. 18 illustrates the example in which the radio communication interface 863 includes the multiple RF circuits 864, the radio communication interface 863 may also include a single RF circuit 864.

In the eNB 830 shown in FIG. 18, one or more structural elements included in the processing unit 150 (the transmission processing unit 151 and/or the reporting unit 153) described with reference to FIG. 10 may be implemented by the radio communication interface 855 and/or the radio communication interface 863. Alternatively, at least some of these constituent elements may be implemented by the controller 851. As an example, a module which includes a part (for example, the BB processor 856) or all of the radio communication interface 855 and/or the controller 851 may be mounted in eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the radio communication interface 855 (for example, the BB processor 856) and/or the controller 851 may execute the program. As described above, the eNB 830, the base station device 850, or the module may be provided as a device which includes the one or more structural elements, and the program for causing the processor to function as the one or more structural elements may be provided. In addition, a readable recording medium in which the program is recorded may be provided.

In addition, in the eNB 830 shown in FIG. 18, the radio communication unit 120 described, for example, with reference to FIG. 10 may be implemented by the radio communication interface 863 (for example, the RF circuit 864). Moreover, the antenna unit 110 may be implemented by the antenna 840. In addition, the network communication unit 130 may be implemented by the controller 851 and/or the network interface 853. The storage unit 140 may be implemented by the memory 852.

<3. Application Examples Regarding Terminal Devices>

(First Application Example)

FIG. 19 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 913 may also be a one chip module that has the BB processor 913 and the RF circuit 914 integrated thereon. The radio communication interface 912 may include the multiple BB processors 913 and the multiple RF circuits 914, as illustrated in FIG. 19. Although FIG. 19 illustrates the example in which the radio communication interface 913 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 19. Although FIG. 19 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 19 via feeder lines, which are partially shown as dashed lines in the figure. The auxiliary controller 919 operates a minimum necessary function of the smartphone 900, for example, in a sleep mode.

In the smartphone 900 shown in FIG. 19, one or more structural elements included in the processing unit 240 (the acquisition unit 241 and/or the reception processing unit 243) described with reference to FIG. 11 may be implemented by the radio communication interface 912. Alternatively, at least some of these constituent elements may be implemented by the processor 901 or the auxiliary controller 919. As an example, a module which includes a part (for example, the BB processor 913) or all of the radio communication interface 912, the processor 901 and/or the auxiliary controller 919 may be mounted in the smartphone 900, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the smartphone 900, and the radio communication interface 912 (for example, the BB processor 913), the processor 901 and/or the auxiliary controller 919 may execute the program. As described above, the smartphone 900 or the module may be provided as a device which includes the one or more structural elements, and the program for causing the processor to function as the one or more structural elements may be provided. In addition, a readable recording medium in which the program is recorded may be provided.

In addition, in the smartphone 900 shown in FIG. 19, the radio communication unit 220 described, for example, with reference to FIG. 11 may be implemented by the radio communication interface 912 (for example, the RF circuit 914). Moreover, the antenna unit 210 may be implemented by the antenna 916. The storage unit 230 may be implemented by the memory 902.

(Second Application Example)

FIG. 20 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 20. Although FIG. 20 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 20. Although FIG. 20 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 20 via feeder lines that are partially shown as dashed lines in the figure. The battery 938 accumulates power supplied form the vehicle.

In the car navigation device 920 shown in FIG. 20, one or more structural elements included in the processing unit 240 (the acquisition unit 241 and/or the reception processing unit 243) described with reference to FIG. 11 may be implemented by the radio communication interface 933. Alternatively, at least some of these constituent elements may be implemented by the processor 921. As an example, a module which includes a part (for example, the BB processor 934) or all of the radio communication interface 933 and/or the controller 921 may be mounted in the car navigation device 920, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the car navigation device 920, and the radio communication interface 933 (for example, the BB processor 934) and/or the controller 921 may execute the program. As described above, the car navigation device 920 or the module may be provided as a device which includes the one or more structural elements, and the program for causing the processor to function as the one or more structural elements may be provided. In addition, a readable recording medium in which the program is recorded may be provided.

In addition, in the car navigation device 920 shown in FIG. 20, the radio communication unit 220 described, for example, with reference to FIG. 11 may be implemented by the radio communication interface 933 (for example, the RF circuit 935). Moreover, the antenna unit 210 may be implemented by the antenna 937. The storage unit 230 may be implemented by the memory 922.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the acquisition unit 241 and/or the reception processing unit 243. The vehicle module 942 generates vehicle data such as vehicle speed, engine speed, and trouble information, and outputs the generated data to the in-vehicle network 941.

<4. Conclusion>

The base station 100 according to an embodiment of the present disclosure selects a transmission weight by which signals to be SPC-multiplexed are to be multiplied. In selecting the transmission weight, the base station 100 may either dynamically decide or statically define the transmission weight to be selected.

The terminal device 200 according to an embodiment of the present disclosure receives a report on a transmission weight switchable timing from the base station 100, and reports a transmission weight switching request to the base station 100 in response.

An embodiment of the present disclosure provides the base station 100 and the terminal device 200 that can change a transmission weight by which a signal is to be multiplied for each of users for which multiplexing is performed, and can improve a bit error rate or implement a remedy for a poor bit error rate.

It should be understood by those skilled in the art that various modifications, combinations, sub-combinations and alterations may occur depending on design requirements and other factors insofar as they are within the scope of the appended claims or the equivalents thereof.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A transmission device including:

a transmission processing unit configured to select a transmission weight by which a plurality of signal points are to be multiplied, multiply a signal of each signal point by the selected transmission weight, and multiplex the multiplied plurality of signal points on a same frequency and time resource, wherein the transmission processing unit changes a selection rule of the transmission weight by which each signal point is to be multiplied.

(2)

The transmission device according to (1), wherein, in multiplexing the plurality of signal points multiplied by the transmission weight on the same frequency and time resource, the transmission processing unit changes a power level to be allocated to each signal point.

(3)

The transmission device according to (2), wherein, in selecting the transmission weight, the transmission processing unit switches a selection rule of the transmission weight by which the signal point with a low power level is to be multiplied.

(4)

The transmission device according to (3), wherein the transmission processing unit quasi-statically selects the transmission weight.

(5)

The transmission device according to (4), wherein the transmission processing unit dynamically selects the transmission weight from among a plurality of quasi-statically selected transmission weights.

(6)

The transmission device according to (5), wherein the transmission processing unit determines whether to switch the transmission weight in dynamically selecting the transmission weight.

(7)

The transmission device according to (6), wherein the transmission processing unit switches the transmission weight at a random timing.

(8)

The transmission device according to (6), wherein the transmission processing unit switches the transmission weight based on feedback from a reception device that receives a transmitted signal.

(9)

The transmission device according to (6), wherein the transmission processing unit switches the transmission weight at a timing decided in advance.

(10)

The transmission device according to (6), wherein the transmission processing unit switches the transmission weight at a timing when a decoding error occurs in a reception device that receives a transmitted signal.

(11)

The transmission device according to (6), wherein the transmission processing unit switches the transmission weight at a timing of retransmission of a once transmitted signal.

(12)

The transmission device according to (6), wherein the transmission processing unit switches the transmission weight based on position information on a reception device that receives a transmitted signal.

(13)

The transmission device according to (5), further including:

a reporting unit configured to report information on the transmission weight switched by the transmission processing unit to a reception device that receives a signal to be transmitted.

(14)

The transmission device according to (13), wherein the reporting unit reports the information on the transmission weight as part of RRC signaling.

(15)

The transmission device according to (13), wherein the reporting unit reports the information on the transmission weight as part of system information.

(16)

The transmission device according to (13), wherein the reporting unit reports the information on the transmission weight as part of downlink control information.

(17)

The transmission device according to (13), wherein the reporting unit reports a codebook index of the transmission weight as the information on the transmission weight.

(18)

The transmission device according to (13), wherein the reporting unit reports a switchable timing of the transmission weight as the information on the transmission weight.

(19)

The transmission device according to (4), wherein the transmission processing unit selects the transmission weight based on an index of a power layer, from among a plurality of quasi-statically selected transmission weights.

(20)

The transmission device according to (4), wherein the transmission processing unit selects the transmission weight using information on a process of cancelling interference, from among a plurality of quasi-statically selected transmission weights.

(21)

The transmission device according to (4), wherein the transmission processing unit selects the transmission weight based on a transmission weight by which a signal point other than the target signal point is to be multiplied, from among a plurality of quasi-statically selected transmission weights.

(22)

A reception device including:

an acquisition unit configured to acquire a report transmitted from a transmission device that selects a transmission weight by which a plurality of signal points are to be multiplied, multiplies a signal of each signal point by the selected transmission weight, and multiplexes and transmits the multiplied plurality of signal points on a same frequency and time resource, which report is on a switchable timing of the transmission weight; and a reporting unit configured to report a switching request of the transmission weight to the transmission device when the acquisition unit acquires the report on the switchable timing of the transmission weight.

(23)

The reception device according to (22), further including:

a reception processing unit configured to determine whether to report the switching request of the transmission weight when the acquisition unit acquires the report on the switchable timing of the transmission weight.

(24)

The reception device according to (23), wherein the reception processing unit determines whether to report the switching request based on quality of a signal received from the transmission device.

(25)

The reception device according to (23), wherein the reception processing unit causes the reporting unit to report the switching request of the transmission weight at a timing when a decoding error of a signal received from the transmission device occurs.

(26)

The reception device according to (22), wherein the reporting unit reports the switching request of the transmission weight as part of RRC signaling.

(27)

The reception device according to (22), wherein the reporting unit reports the switching request of the transmission weight as part of uplink control information.

(28)

A transmission method including:

in selecting a transmission weight by which a plurality of signal points are to be multiplied, multiplying a signal of each signal point by the selected transmission weight, and multiplexing the multiplied plurality of signal points on a same frequency and time resource, changing a selection rule of the transmission weight by which each signal point is to be multiplied.

(29)

A reception method including:

acquiring a report transmitted from a transmission device that selects a transmission weight by which a plurality of signal points are to be multiplied, multiplies a signal of each signal point by the selected transmission weight, and multiplexes and transmits the multiplied plurality of signal points on a same frequency and time resource, which report is on a switchable timing of the transmission weight; and reporting a switching request of the transmission weight to the transmission device when the report on the switchable timing of the transmission weight is acquired.

(30)

A computer program causing a computer to execute:

in selecting a transmission weight by which a plurality of signal points are to be multiplied, multiplying a signal of each signal point by the selected transmission weight, and multiplexing the multiplied plurality of signal points on a same frequency and time resource, changing a selection rule of the transmission weight by which each signal point is to be multiplied.

(31)

A computer program causing a computer to execute:

acquiring a report transmitted from a transmission device that selects a transmission weight by which a plurality of signal points are to be multiplied, multiplies a signal of each signal point by the selected transmission weight, and multiplexes and transmits the multiplied plurality of signal points on a same frequency and time resource, which report is on a switchable timing of the transmission weight; and reporting a switching request of the transmission weight to the transmission device when the report on the switchable timing of the transmission weight is acquired.

(32)

A device including:

circuitry configured to select a transmission weight by which each of a plurality of signal points is to be multiplied;

multiply a signal corresponding to each of the plurality of signal points by the selected transmission weight;

multiplex the multiplied signals corresponding to each of the plurality of signal points on a same frequency and time resource; and modify a selection rule corresponding to the transmission weight by which each of the plurality of signal points is to be multiplied.

(33)

The device of (32), wherein the circuitry is configured to change a power level allocated to each of the plurality of signal points when multiplexing the multiplied signals corresponding to each of the plurality of signal points on the same frequency and time resource.

(34)

The device of (33), wherein the circuitry is configured to select the transmission weight by switching a selection rule of the transmission weight by which a signal point with a power level less than a predetermined value is to be multiplied.

(35)

The device of (32), wherein the circuitry is configured to quasi-statically select the transmission weight.

(36)

The device of (32), wherein the circuitry is configured to dynamically select the transmission weight from among a plurality of quasi-statically selected transmission weights.

(37)

The device of (36), wherein the circuitry is configured to determine whether to switch the transmission weight in dynamically selecting the transmission weight.

(38)

The device of (32), wherein the circuitry is configured to switch the transmission weight at a random timing.

(39)

The device of (32), wherein the circuitry is configured to switch the transmission weight based on feedback from a reception device that receives a transmitted signal.

(40)

The device of (32), wherein the circuitry is configured to switch the transmission weight at a predetermined timing.

(41)

The device of (32), wherein the circuitry is configured to switch the transmission weight in response to determining that a decoding error has occurred in a reception device that receives a transmitted signal.

(42)

The device of (32), wherein the circuitry is configured to switch the transmission weight at a timing of retransmission of a previously transmitted signal.

(43)

The device of (32), wherein the circuitry is configured to switch the transmission weight based on position information of a reception device that receives a transmitted signal.

(44)

The device of (32), further including:
a communication interface configured to report information on a transmission weight switched by the circuitry to a reception device that receives a signal to be transmitted.

(45)

The device of (44), wherein the communication interface is configured to report the information on the transmission weight as part of downlink control information.

(46)

The device of (44), wherein the communication interface is configured to report a codebook index of the transmission weight as the information on the transmission weight.

(47)

The device of (44), wherein the circuitry is configured to report a switchable timing of the transmission weight as the information on the transmission weight.

(48)

The device of (35), wherein the circuitry is configured to select the transmission weight based on an index of a power layer, from among a plurality of quasi-statically selected transmission weights.

(49)

The device of (35), wherein the circuitry is configured to select the transmission weight using information on a process of cancelling interference, from among a plurality of quasi-statically selected transmission weights.

(50)

The device of (35), wherein the circuitry is configured to select the transmission weight for a target signal point based on a transmission weight by which a signal point other than a target signal point is to be multiplied, from among a plurality of quasi-statically selected transmission weights.

(51)

A device including:
circuitry configured to acquire a report transmitted from a transmission device that selects a transmission weight by which each of a plurality of signal points is to be multiplied, multiplies a signal corresponding to each signal point by the selected transmission weight, and multiplexes and transmits the multiplied signals corresponding to each of the plurality of signal points on a same frequency and time resource, wherein the report includes information indicating a switchable timing of the transmission weight; and
a communication interface configured to report a switching request of the transmission weight to the transmission device upon acquiring the report including information indicating the switchable timing of the transmission weight.

REFERENCE SIGNS LIST 1 system
100 base station
101 cell
110 antenna unit
120 radio communication unit
130 network communication unit
140 storage unit
150 processing unit
151 transmission processing unit
153 reporting unit
200 terminal device
210 antenna unit
220 radio communication unit
230 storage unit
240 processing unit
241 acquisition unit
243 reception processing unit
245 reporting unit

The invention claimed is:

1. A device comprising:
circuitry configured to
select a transmission weight by which each of a plurality of signal points is to be multiplied,
multiply a signal corresponding to each of the plurality of signal points by the selected transmission weight,
multiplex the multiplied signals corresponding to each of the plurality of signal points on a same frequency and time resource,
modify a selection rule corresponding to the transmission weight by which each of the plurality of signal points is to be multiplied, and
select the transmission weight based on an index of a power layer, from among a plurality of selected transmission weights.

2. The device of claim 1, wherein
the circuitry is configured to change a power level allocated to each of the plurality of signal points when multiplexing the multiplied signals corresponding to each of the plurality of signal points on the same frequency and time resource.

3. The device of claim 2, wherein
the circuitry is configured to select the transmission weight by switching a selection rule of the transmission weight by which a signal point with a power level less than a predetermined value is to be multiplied.

4. The device of claim 1, wherein
the circuitry is configured to quasi-statically select the transmission weight.

5. The device of claim 1, wherein
the circuitry is configured to dynamically select the transmission weight from among a plurality of quasi-statically selected transmission weights.

6. The device of claim 5, wherein
the circuitry is configured to determine whether to switch the transmission weight in dynamically selecting the transmission weight.

7. The device of claim 1, wherein
the circuitry is configured to switch the transmission weight at a random timing.
8. The device of claim 1, wherein
the circuitry is configured to switch the transmission weight based on feedback from a reception device that receives a transmitted signal.
9. The device of claim 1, wherein
the circuitry is configured to switch the transmission weight at a predetermined timing.
10. The device of claim 1, wherein
the circuitry is configured to switch the transmission weight in response to determining that a decoding error has occurred in a reception device that receives a transmitted signal.
11. The device of claim 1, wherein
the circuitry is configured to switch the transmission weight at a timing of retransmission of a previously transmitted signal.
12. The device of claim 1, wherein
the circuitry is configured to switch the transmission weight based on position information of a reception device that receives a transmitted signal.
13. The device of claim 1, further comprising:
a communication interface configured to report information on a transmission weight switched by the circuitry to a reception device that receives a signal to be transmitted.
14. The device of claim 13, wherein
the communication interface is configured to report the information on the transmission weight as part of downlink control information.
15. The device of claim 13, wherein
the communication interface is configured to report a codebook index of the transmission weight as the information on the transmission weight.
16. The device of claim 13, wherein
the circuitry is configured to report a switchable timing of the transmission weight as the information on the transmission weight.
17. The device of claim 4, wherein
the circuitry is configured to select the transmission weight using information on a process of cancelling interference, from among a plurality of quasi-statically selected transmission weights.
18. The device of claim 4, wherein
the circuitry is configured to select the transmission weight for a target signal point based on a transmission weight by which a signal point other than a target signal point is to be multiplied, from among a plurality of quasi-statically selected transmission weights.
19. A device comprising:
circuitry configured to
acquire a report transmitted from a transmission device that selects a transmission weight by which each of a plurality of signal points is to be multiplied, multiplies a signal corresponding to each signal point by the selected transmission weight, and multiplexes and transmits the multiplied signals corresponding to each of the plurality of signal points on a same frequency and time resource, wherein the report includes information indicating a switchable timing of the transmission weight; and
a communication interface configured to report a switching request of the transmission weight to the transmission device upon acquiring the report including information indicating the switchable timing of the transmission weight.
20. A device comprising:
circuitry configured to
select a transmission weight by which each of a plurality of signal points is to be multiplied,
multiply a signal corresponding to each of the plurality of signal points by the selected transmission weight,
multiplex the multiplied signals corresponding to each of the plurality of signal points on a same frequency and time resource,
modify a selection rule corresponding to the transmission weight by which each of the plurality of signal points is to be multiplied, and
select the transmission weight for a target signal point based on a transmission weight by which a signal point other than a target signal point is to be multiplied, from among a plurality of selected transmission weight, the selected transmission weights being selected by the circuitry.

* * * * *